United States Patent
Hio

(10) Patent No.: US 8,718,438 B2
(45) Date of Patent: May 6, 2014

(54) TERMINAL APPARATUS AND INFORMATION TRANSMISSION METHOD

(75) Inventor: Akimitsu Hio, Tokyo (JP)

(73) Assignee: Sony Corporation (JP)

( * ) Notice: Subject to any disclaimer, the term of this patent is extended or adjusted under 35 U.S.C. 154(b) by 946 days.

(21) Appl. No.: 12/455,483

(22) Filed: Jun. 2, 2009

(65) Prior Publication Data

US 2009/0304347 A1 Dec. 10, 2009

(30) Foreign Application Priority Data

Jun. 9, 2008 (JP) ................ P2008-150640

(51) Int. Cl.
*H04N 5/932* (2006.01)
*H04N 5/77* (2006.01)

(52) U.S. Cl.
USPC ........... 386/201; 386/224; 386/210; 386/228; 386/231; 386/279

(58) Field of Classification Search
USPC .................. 386/201, 224, 210, 228, 231, 278
See application file for complete search history.

(56) References Cited

U.S. PATENT DOCUMENTS

| | | | |
|---|---|---|---|
| 5,724,322 A | 3/1998 | Kondo et al. | |
| 6,578,047 B1 | 6/2003 | Deguchi | |
| 7,200,586 B1* | 4/2007 | Deguchi et al. | 1/1 |
| 7,496,211 B2 | 2/2009 | Yamagami et al. | |
| 8,295,957 B2* | 10/2012 | Holzberg et al. | 700/94 |
| 2001/0031131 A1* | 10/2001 | Fukai et al. | 386/52 |
| 2005/0152665 A1 | 7/2005 | Shibata et al. | |

FOREIGN PATENT DOCUMENTS

| | | |
|---|---|---|
| JP | 07-057436 | 3/1995 |
| JP | 2000-339345 | 12/2000 |
| JP | 2001-125908 | 5/2001 |
| JP | 2003-299010 | 10/2003 |
| JP | 2004-072132 | 3/2004 |
| JP | 2006053977 A | 2/2006 |
| JP | 2006-074800 A | 3/2006 |
| JP | 2007-082088 | 3/2007 |
| JP | 2007067456 A | 3/2007 |
| JP | 2007-305213 | 11/2007 |

OTHER PUBLICATIONS

Office Action from Japanese Application No. 2008-150640, dated May 25, 2010.

* cited by examiner

*Primary Examiner* — Helen Shibru
(74) *Attorney, Agent, or Firm* — Lerner, David, Littenberg, Krumholz & Mentlik, LLP

(57) ABSTRACT

A terminal apparatus includes an operation unit, a time clocking unit performing time clocking, a communication unit performing communication with an external apparatus, and a control unit. The control unit executes a time synchronization processing for clocked time synchronization with the external apparatus having a time clocking unit. The control unit also executes a time information acquisition processing to acquire clocked time information by the time clocking unit with a timing at which an operation is made on the operation unit. The control unit further executes a transmission control processing to control the time information acquired by the time information acquisition processing to be transmitted to the external apparatus through the communication unit.

8 Claims, 17 Drawing Sheets

FIRST EMBODIMENT

FIG.1
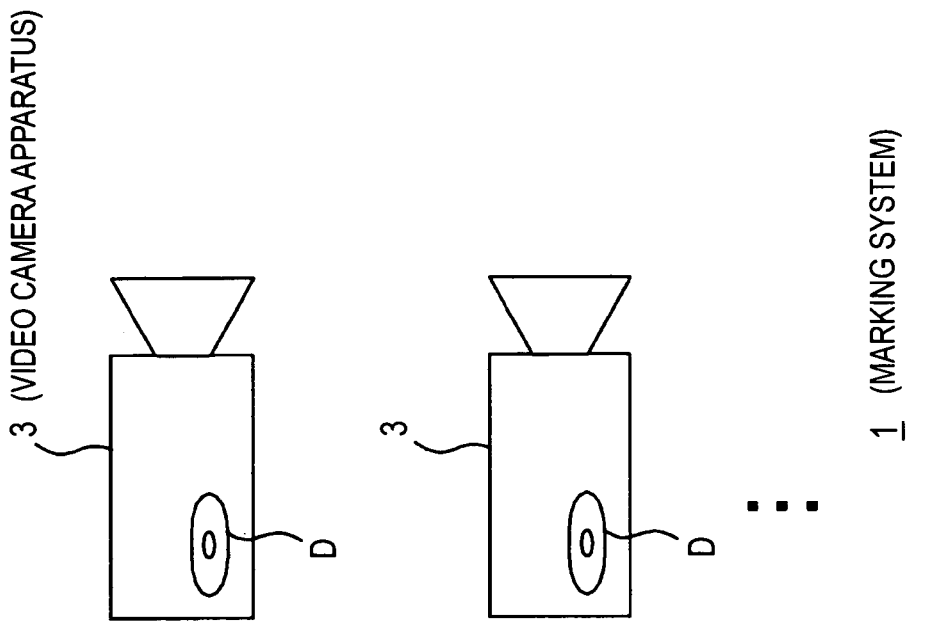
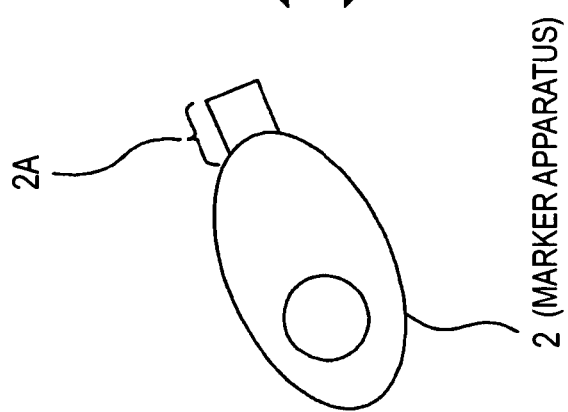

MARK TABLE

FIG.5A

<BEFORE COVERAGE>

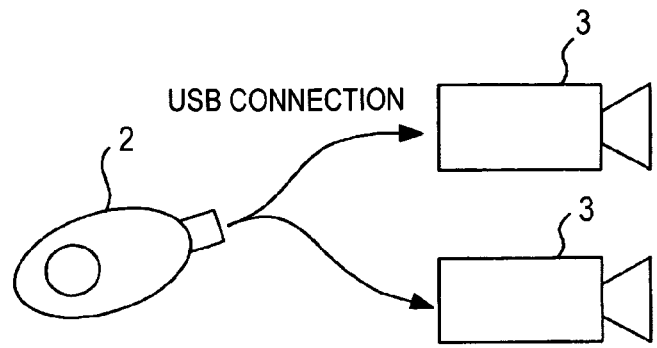

PAIRING WITH TARGET VIDEO CAMERA APPARATUS
○ TIME SYNCHRONIZATION
○ REGISTRATION OF MARKER ID IN CAMERA

FIG.5B

<WHEN COVERAGE>

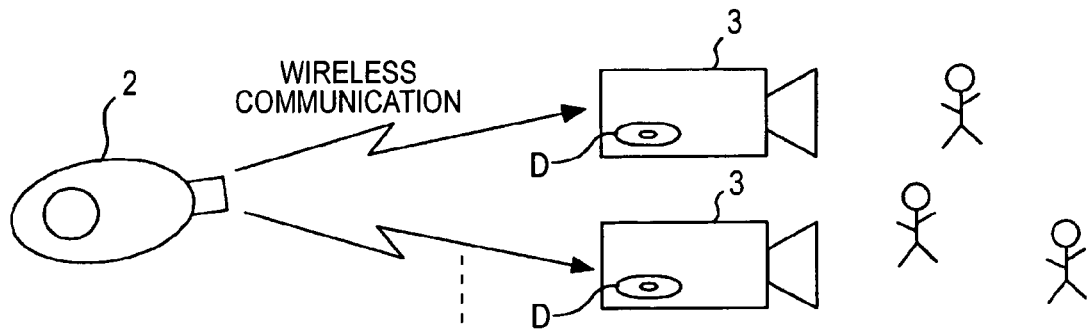

<1> ACQUIRE TIME INFORMATION WHEN BUTTON OPERATION AS MARK TIME INFORMATION
<2> ADD MARK TIME INFORMATION TO TIME LIST
<3> TRANSMIT TIME LIST (INCLUDING MARKER ID)

<4> RECEIVE TIME LIST
<5> CHECK WHETHER MARKER ID IS REGISTERED BEFOREHAND OR NOT
<6> ACQUIRE UNACQUIRED MARK TIME INFORMATION IN TIME LIST
<7> SPECIFY CLIP CORRESPONDING TO MARK TIME INFORMATION FROM INFORMATION CONTENTS OF CLIP TABLE
<8> MARK TIME  TIME CODE CONVERSION
<9> UPDATE (GENERATE) MARK TABLE

FIG.6

```
MarkerID="0001"
ClipStart no="1"date="2008,1,22"time="13:50:00:00"
ClipStart no="2"date="2008,1,22"time="14:45:35:23"
```

CLIP TABLE

FIG.7

```
MarkerID="0001"
TimeMark date="2008,1,22"time="13:54:23:02"
TimeMark date="2008,1,22"time="14:01:28:04"
TimeMark date="2008,1,22"time="14:14:19:18"
TimeMark date="2008,1,22"time="14:22:50:22"
```

TIME LIST

WHEN COVERAGE

FIG.14A

<WHEN COVERAGE>

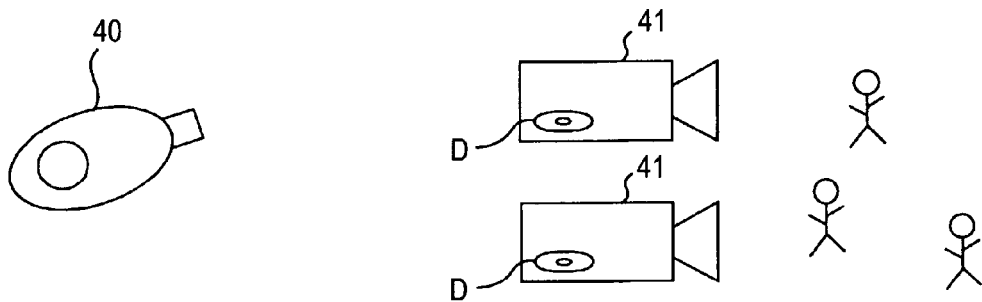

<1> ACQUIRE, AS MARK TIME INFORMATION, TIME INFORMATION WHEN BUTTON OPERATION IS MADE
<2> ADD MARK TIME INFORMATION TO TIME LIST

FIG.14B

<AFTER COVERAGE>

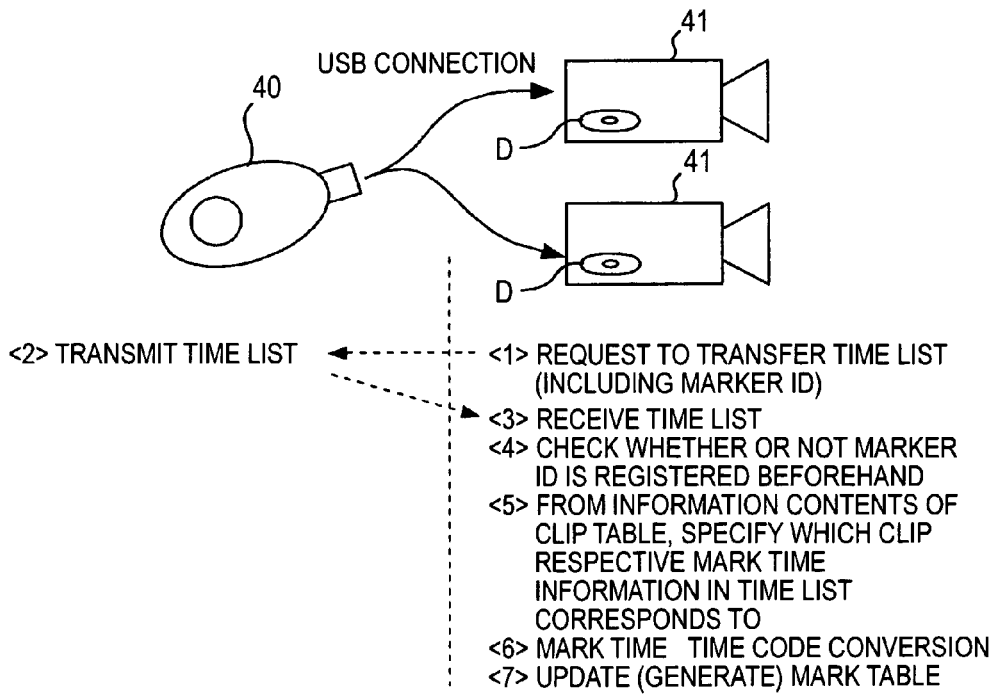

<2> TRANSMIT TIME LIST ◀------ <1> REQUEST TO TRANSFER TIME LIST (INCLUDING MARKER ID)
<3> RECEIVE TIME LIST
<4> CHECK WHETHER OR NOT MARKER ID IS REGISTERED BEFOREHAND
<5> FROM INFORMATION CONTENTS OF CLIP TABLE, SPECIFY WHICH CLIP RESPECTIVE MARK TIME INFORMATION IN TIME LIST CORRESPONDS TO
<6> MARK TIME  TIME CODE CONVERSION
<7> UPDATE (GENERATE) MARK TABLE

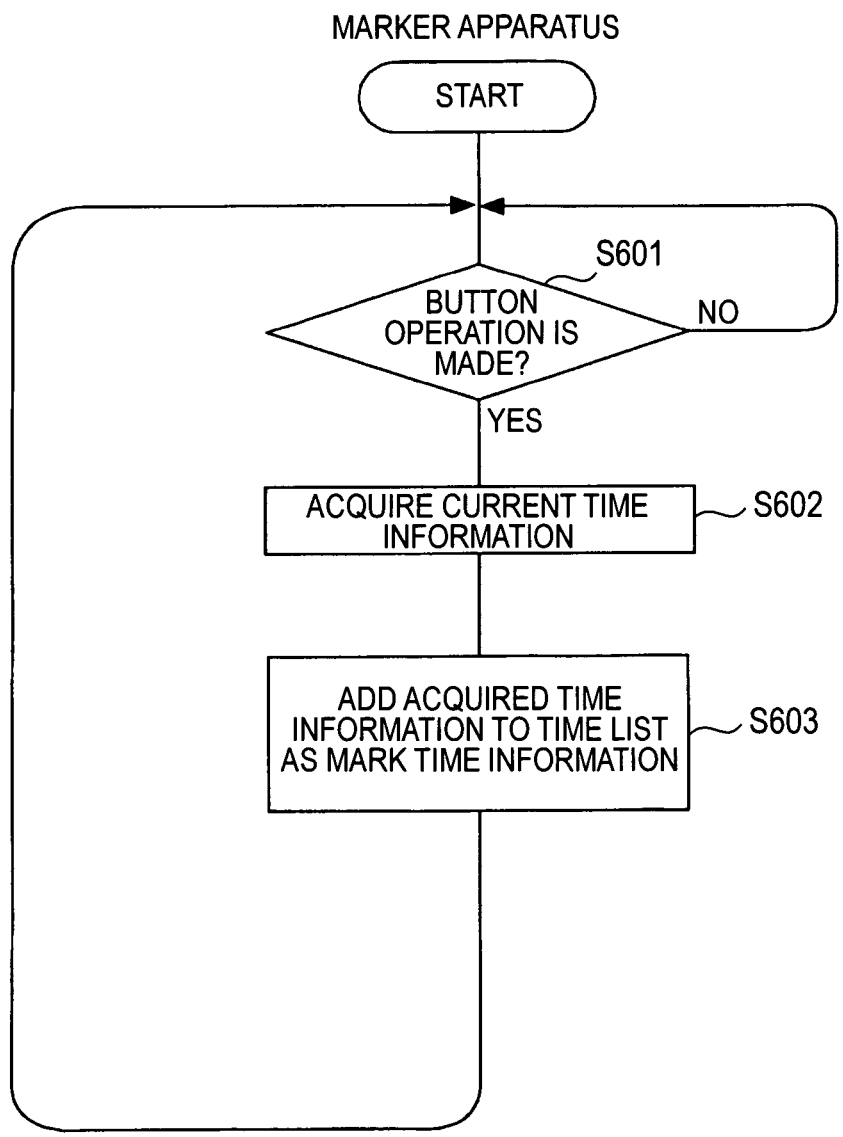

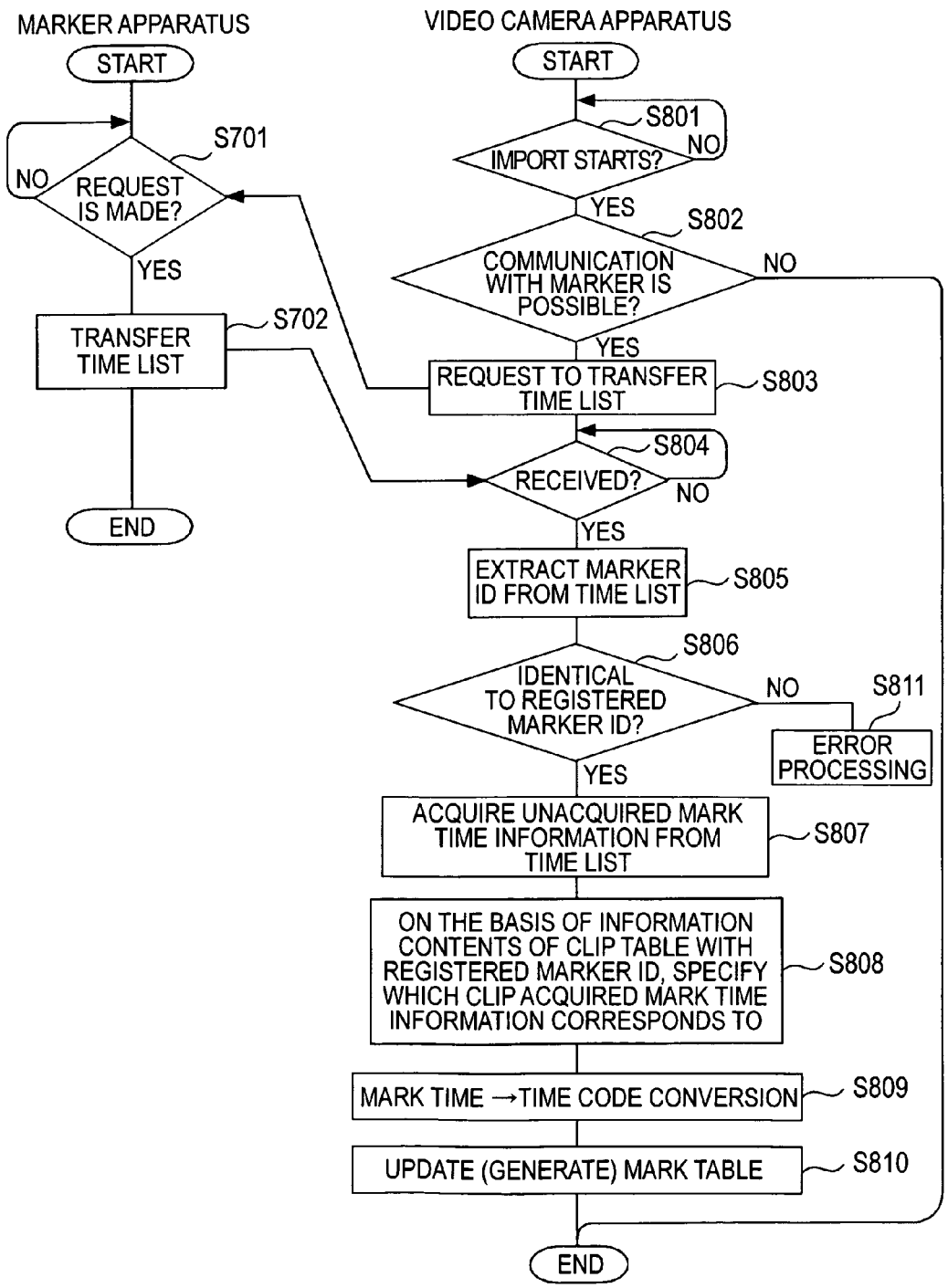

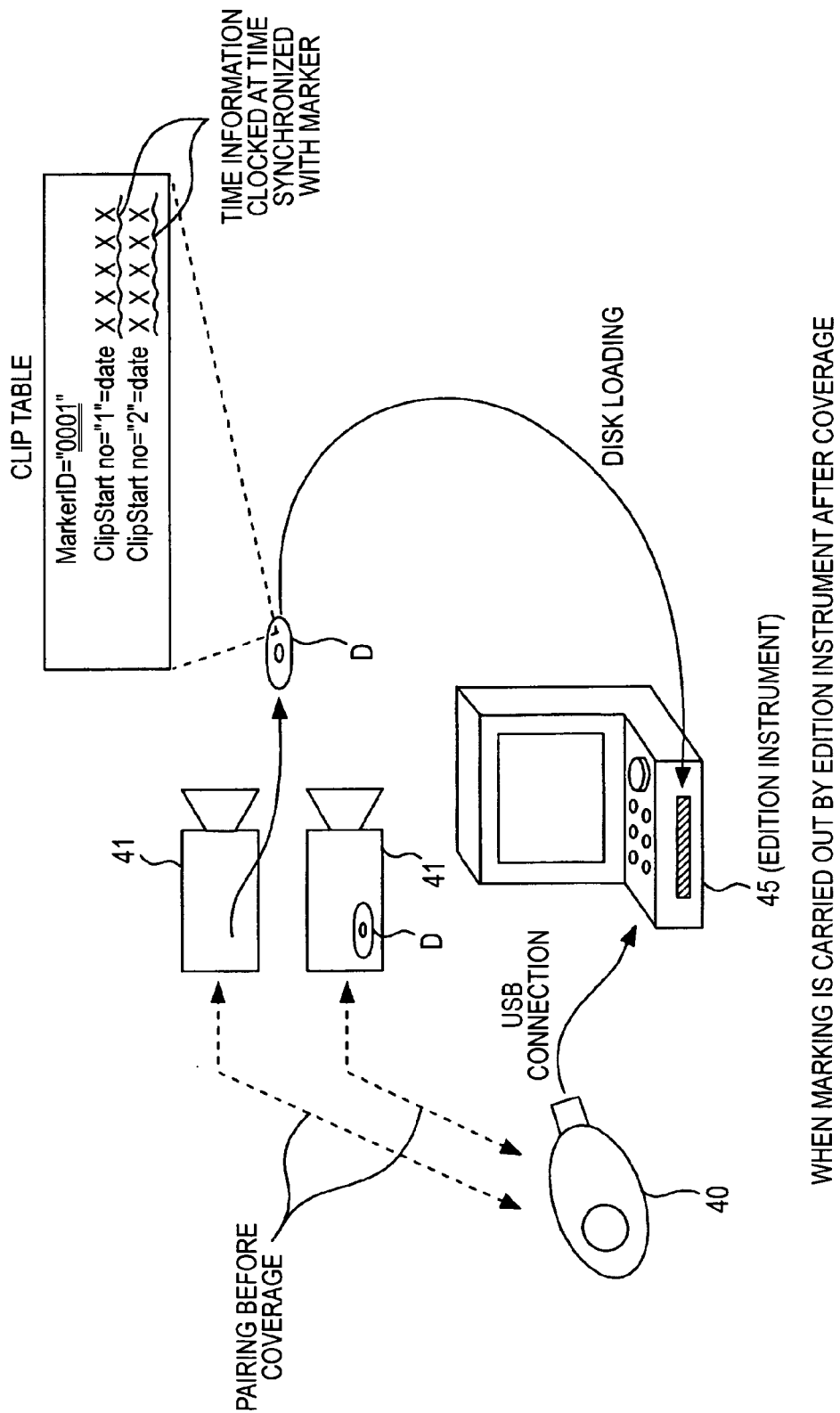

TERMINAL APPARATUS AND INFORMATION TRANSMISSION METHOD

The present application claims priority from Japanese Patent Application No. JP 2008-150640 filed in the Japanese Patent Office on Jun. 9, 2008, the entire content of which is incorporated herein by reference.

BACKGROUND OF THE INVENTION

1. Field of the Invention

The present invention relates to a technique for putting a mark at a necessary position of time-series data, such as motion image data or sound data, and in particular, to a terminal apparatus, which serves as an input apparatus for specifying and inputting an insertion position of the mark, and to an information transmission method for a terminal apparatus.

2. Description of the Related Art

A video camera apparatus for motion image recording comes into wide use. As the video camera apparatus, for example, a so-called commercial video camera apparatus that is used by a broadcasting engineer or the like is given various functions to facilitate ease of edition after photographing.

For example, a video camera apparatus is known which has a function to put a mark on recorded data by an operation of a predetermined button provided in a camera main body during photographing. For example, a mark may be put at an interest point of an event during coverage (for example, a homerun scene during coverage on a baseball game or the like), and the interest point may be smoothly cued by the mark at the time of edition afterward. In this way, smooth edition can be achieved.

JP-A-2004-72132, JP-A-2007-82088, and JP-A-2007-305213 are examples of the related art.

SUMMARY OF THE INVENTION

At present, the mark is put by an operation of a button provided in the camera main body, as described above. That is, in the related art, the mark is assumed to be put by a cameraman.

However, since the cameraman centers his/her attention on photographing during coverage, it is difficult for the cameraman to operate the mark button with appropriate timing. According to the circumstances, the cameraman may not operate the mark button.

From this viewpoint, in the known coverage system, a marking function is not effectively used.

In consideration of the above problems, there is provided a terminal apparatus having the following configuration.

That is, a terminal apparatus according to an embodiment of the invention includes an operation unit, a time clocking unit performing time clocking, a communication unit performing communication with an external apparatus, and a control unit.

The control unit executes a time synchronization processing for clocked time synchronization with the external apparatus having a time clocking unit.

With timing at which an operation is made on the operation unit, a time information acquisition processing to acquire clocked time information by the time clocking unit, and a transmission control processing to control the time information acquired by the time information acquisition processing to be transmitted to the external apparatus through the communication unit are performed.

With this configuration, it is possible to implement a terminal apparatus that transmits information about a marking timing specified by an operation to an external apparatus. Therefore, the external apparatus, such as a video camera apparatus or the like, which receives the information about the marking timing, can put a mark at a position of time-series data, such as motion image data or the like, designated by the received information about the marking timing.

If a system including the terminal apparatus according to the embodiment of the invention is implemented, marking can be carried out by an operation input to the terminal apparatus rather than an operation input to an apparatus, such as a video camera apparatus or the like, which actually performs recording of time-series data. Therefore, marking can be carried out by an instruction of a third person who uses the terminal apparatus, rather than a person who records time-series data, such as a cameraman or the like.

According to the embodiment of the invention, a third person other than a person who records time-series data can specify the marking timing. As a result, the marking timing can be specified reliably and with appropriate timing, as compared with the known coverage system in which a person who records time-series data has to personally put a mark.

BRIEF DESCRIPTION OF THE DRAWINGS

FIG. 1 is a diagram showing the overview of a marking system according to a first embodiment of the invention;

FIGS. 5A and 5B are diagrams schematically showing an operation in the marking system of the first embodiment;

FIG. 6 is a diagram showing an example of a data structure of a clip table;

FIG. 7 is a diagram showing an example of a data structure of a time list;

FIGS. 14A and 14B are diagrams schematically showing an operation in a marking system of the second embodiment;

FIG. 15 is a flowchart showing a procedure of a processing which should be executed in the terminal apparatus of the second embodiment at the time of coverage;

FIG. 16 is a flowchart showing a procedure of a processing which should be executed in the signal processing apparatus of the second embodiment at the time of coverage;

FIG. 17 is a diagram schematically showing an operation in a marking system when marking is carried out by an edition instrument after coverage.

DESCRIPTION OF THE PREFERRED EMBODIMENTS

Best modes (hereinafter, referred to as embodiments) for carrying out the invention will now be described.

First Embodiment

Overview of Marking System

FIG. 1 is a diagram showing the overview of a marking system 1 as a first embodiment of the invention, which can be configured on the basis of the invention.

As shown in FIG. 1, the marking system 1 of this embodiment includes a marker apparatus 2 and a video camera apparatus 3.

The video camera apparatus 3 is configured to perform recording of captured image (motion image) data onto an optical disk D loaded thereon. The video camera apparatus 3 is also configured to play back data recorded onto the optical disk D.

As will be understood from a subsequent description, the marker apparatus 2 functions as an apparatus for specifying a marking timing for motion image data photographed and recorded by the video camera apparatus 3.

In the first embodiment, the marker apparatus 2 and the video camera apparatus 3 are configured to perform data communication through wireless communication, such as wireless LAN (Local Area Network) or the like.

The marker apparatus 2 and the video camera apparatus 3 are also configured to perform data communication in a wired manner. In this case, the marker apparatus 2 is provided with a USB (Universal Serial Bus) connection terminal 2A. The USB connection terminal 2A is connected to a USB connection terminal (a USB connection terminal 3A which will be described below) provided in the video camera apparatus 3, such that data communication can be performed between the marker apparatus 2 and the video camera apparatus 3.

[Clip and Mark]

In this embodiment, the video camera apparatus 3 records motion image data obtained by an imaging operation in a clip file format. Information about a mark table for management of a mark position on the time axis of motion image data may be attached to the clip file as metadata.

Figure 2:
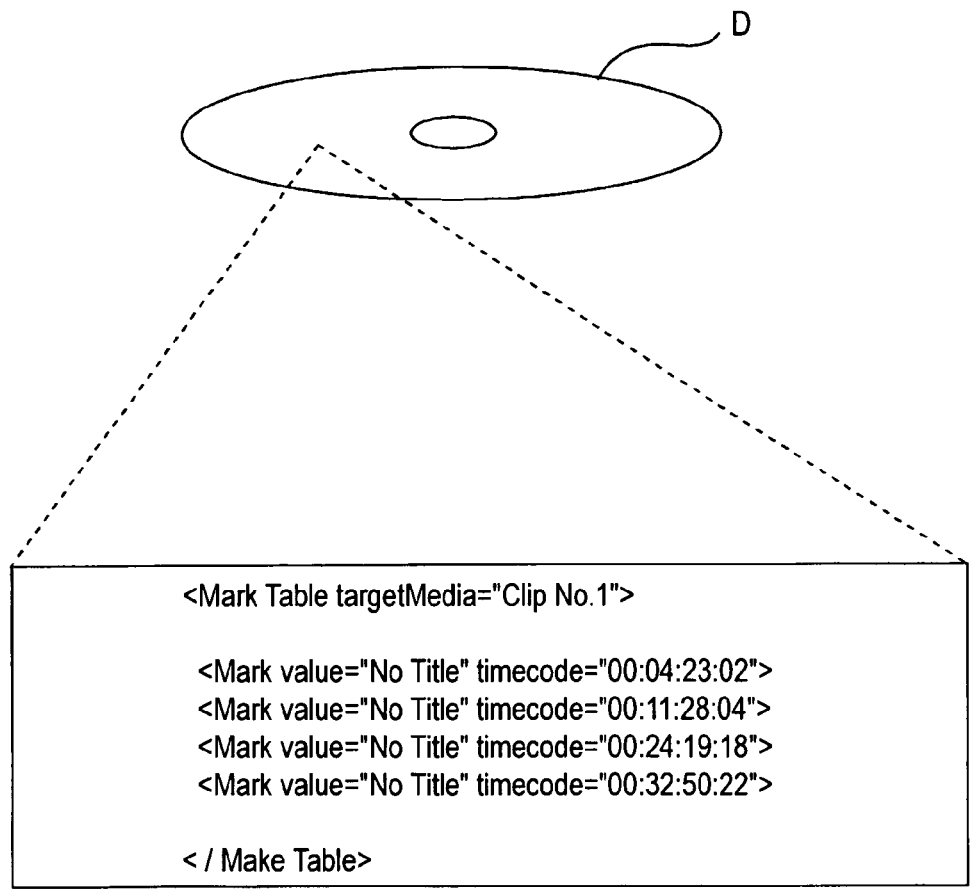
FIG. 2 is a diagram showing an example of a data structure of a mark table for mark position management.

FIG. 2 is a diagram showing an example of a data structure of such a mark table.

Information about a mark table is attached to each clip. For this reason, a mark table stores therein information about a clip No. for designating a clip corresponding to mark position information stored in the mark table. In the drawing, <MarkTable targetMedia="Clip No. 1"> corresponds to the information about the clip No.

In the mark table, information about a time code is stored as information designating a mark position. In this example, as described below, when a clip is recorded, the video camera apparatus 3 puts information about a time code representing a time length elapsed since the clip starts to be recorded on a frame image basis. For this reason, as described above, if the information about a time code is stored in the mark table, the position of a mark put on the clip may be specified.

In this example, as the specification, it is configured such that information about a title (in the drawings, "Mark value") is also stored in each clip. With respect to the title information, when no title input operation is made by a user, "No Title" is automatically stored, as shown in the drawing.

The information about the mark table shown in FIG. 2 is finally recorded onto the optical disk D loaded in the video camera apparatus 3 as metadata of a clip file.

[Configuration of Terminal Apparatus]

Figure 3:
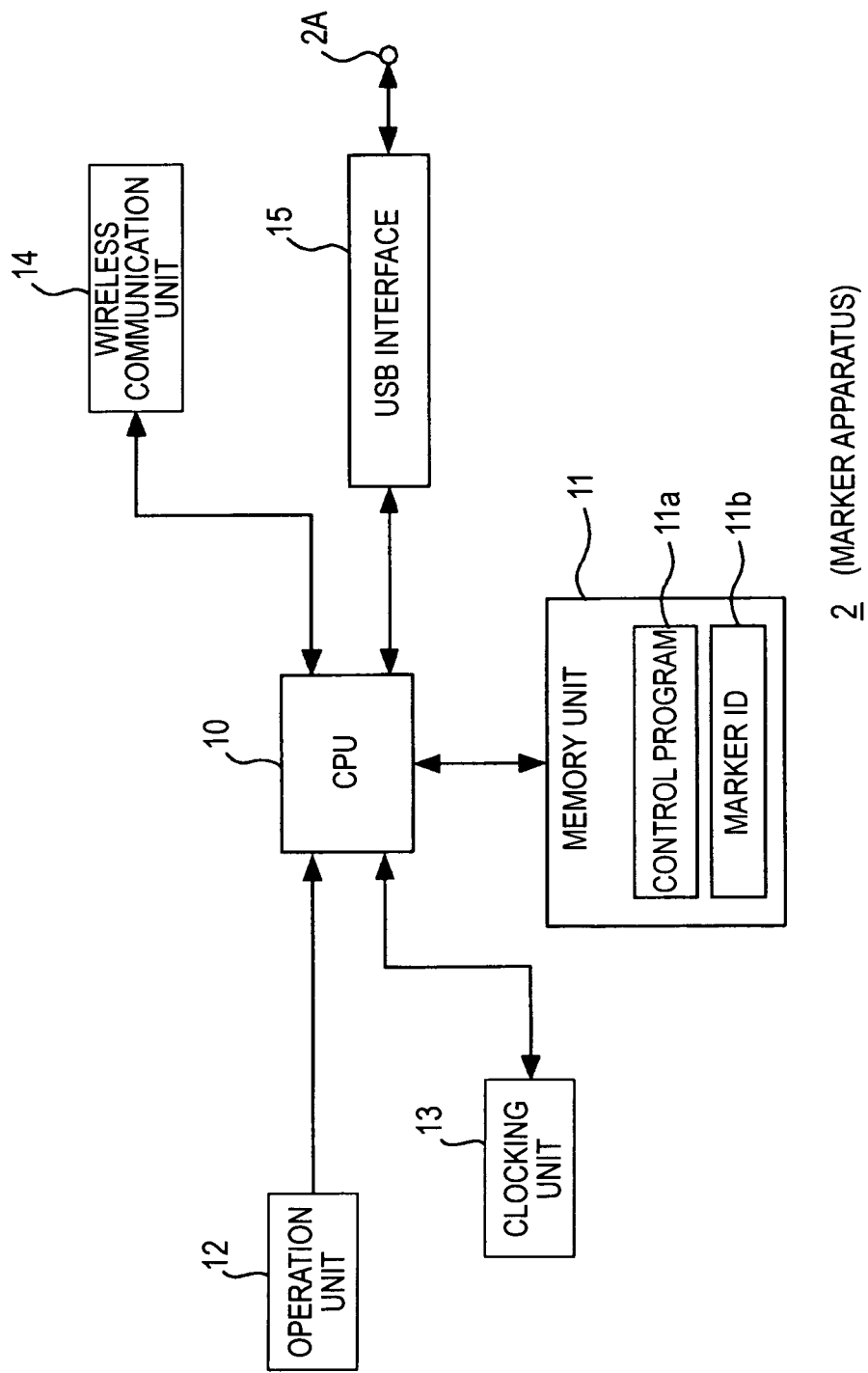
FIG. 3 is a block diagram showing the internal configuration of a terminal apparatus according to the first embodiment.

FIG. 3 is a block diagram showing the internal configuration of the marker apparatus 2 shown in FIG. 1 (a terminal apparatus of the first embodiment).

As shown in the drawing, the marker apparatus 2 includes a CPU (Central Processing Unit) 10, a memory unit 11, an operation unit 12, a clocking unit 13, a wireless communication unit 14, a USB interface 15, and a USB connection terminal 2A.

The CPU 10 executes various kinds of control and arithmetic processing based on programs stored in the memory unit 11, and controls the entire marker apparatus 2.

The memory unit 11 collectively denotes various memories, such as ROM (Read Only Memory), RAM (Random Access Memory), flash memory, and the like, which are connected to the CPU.

The memory unit 11 stores therein a control program 11a that causes the CPU 10 to execute a processing, which should be executed in implementation of an operation described below according to this embodiment.

The memory unit 11 also stores therein a marker ID 11b that is needed in implementation of an operation described below according to this embodiment. The marker ID 11b is identification information for identifying the marker apparatus 2, and has different information contents for the individual marker apparatuses 2.

The operation unit 12 has operators provided so as to be exposed through an outer surface of a casing of the marker apparatus 2, and gives a signal corresponding to an operator, on which an operation is made, to the CPU 10 as an operation input signal.

In this example, as the operators of the operation unit 12, at least a mark button for specifying a timing at which the user should put a mark is provided.

The clocking unit 13 performs time clocking. In this example, the clocking unit 13 clocks time in the form of "Year:Month:Day:Hour:Minute:Second".

The wireless communication unit 14 performs data communication with the external apparatus (particularly, in this case, the video camera apparatus 3 shown in FIG. 1) in a wireless manner under the control of the CPU 10. In this example, the wireless communication unit 14 directly performs wireless data communication with the external apparatus in the ad-hoc mode of wireless LAN (Wi-Fi (Wireless Fidelity) ad-hoc mode).

The USB interface 15 performs data communication based on the USB (Universal Serial Bus) system with the external apparatus (particularly, in this case, the video camera apparatus 3) connected thereto through the USB connection terminal 2A under the control of the CPU 10.

[Configuration of Signal Processing Apparatus]

Figure 4:
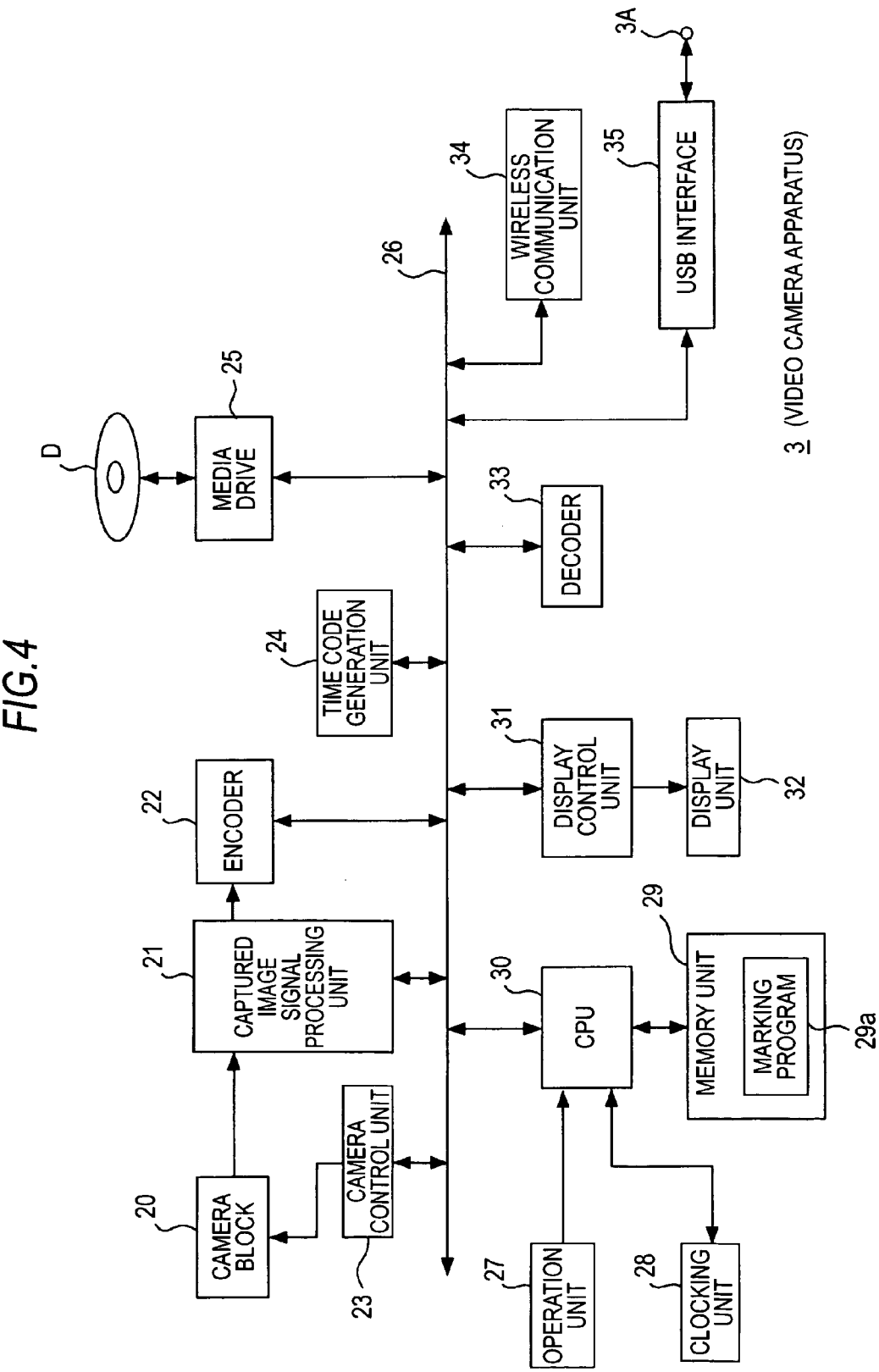
FIG. 4 is a block diagram showing the internal configuration of a signal processing apparatus according to the first embodiment.

FIG. 4 is a block diagram showing the internal configuration of the video camera apparatus 3 shown in FIG. 1 (a signal processing apparatus of the first embodiment).

In FIG. 4, for convenience of explanation, a description for a sound recording and reproducing system has not been shown, but a clip file actually includes sound data. In this case, a sound signal that should be recorded is input through a microphone (not shown).

For recording of a clip file based on captured image data, the video camera apparatus 3 is provided with a camera block 20, a captured image signal processing unit 21, an encoder 22, a camera control unit 23, a time code generation unit 24, and a media drive 25. Of these, the captured image signal processing unit 21, the encoder 22, the camera control unit 23, the time code generation unit 24, and the media drive 25 are connected to a CPU 30 through a bus 26.

The camera block 20 has an imaging element, such as a CCD (Charge Coupled Device) sensor array or a CMOS (Complementary Metal Oxide Semiconductor) sensor array, and an imaging optical system that has a camera lens, a focus mechanism, a zoom mechanism, a diaphragm, and the like, and forms an image of a subject on the imaging element.

The camera control unit 23 performs on/off control of imaging in the camera block 20, driving control of the focus lens, and the like on the basis of an instruction of the CPU 30.

The captured image signal processing unit 21 has a sample hold/AGC (Automatic Gain Control) circuit, which performs gain adjustment or waveform shaping for a captured image signal obtained by the imaging element in the camera block 20, and a video A/D converter, and obtains captured image data as digital data. The captured image signal processing unit 21 performs a white balance processing, a luminance processing, a color signal processing, and the like for captured image data.

The encoder 22 performs an encode processing to generate recording data necessary to record a clip file based on captured image data under the control of the CPU 30.

Specifically, the encoder 22 performs an image compression processing to compress captured image data supplied from the captured image signal processing unit 21 in accordance with a predetermined image compression system, and a multiplex processing to multiplex compressed image data (stream data) in a time-division manner to generate transport (TS) packets. Note that, during the actual multiplex processing, compressed sound data (stream data) based on a sound pickup signal of the above-described microphone and compressed image stream data are multiplexed in a time-division manner to generate packets.

At the time of clip recording, the TS packets obtained by the encoder 22 are sequentially supplied to the media drive 25.

The media drive 25 performs data recording onto the loaded optical disk D and reproduction of data recorded onto the optical disk D.

At the time of clip recording, the media drive 25 sequentially records the TS packets obtained by the encoder 22 in the above-described manner onto the optical disk D. Information necessary for management of the recorded TS packets as a single clip file is recorded under control of the CPU 30 at the end of recording. In this way, a clip file is generated on the optical disk D.

At the time of clip recording, the above-described time code is also recorded. The time code information generated by the time code generation unit 24 is used for time code recording.

That is, the information about the time code (for example, Hour:Minute:Second:Frame) obtained by the time code generation unit 24 is supplied to the media drive 25 and recorded onto the optical disk D so as to be put in a frame unit of the recorded clip.

The time code recording operation is executed under the control of the CPU 30, for example.

At the time of reproduction of the clip file recorded onto the optical disk D, the TS packets are read by the media drive 25 from the optical disk D and supplied to a decoder 33 through the bus 26 under the control of the CPU 30.

The decoder 33 performs a multiplex processing for the supplied TS packets to obtain compressed image data, and performs an expansion processing for the compressed image data to obtain digital image data.

In the video camera apparatus 3, for display to a user (in this case, a coverage staff, such as a cameraman or the like), a display unit 32 and a display control unit 31 are provided.

The display unit 32 has a display panel, such as a liquid crystal display or the like, and a display driving unit driving the display panel section. The display driving unit has a pixel driving circuit for performing information display on the display panel. The pixel driving circuit applies a driving signal based on an image signal to respective pixels, which are arranged in a matrix on the display panel, with predetermined horizontal/vertical driving timing so as to cause the display panel to perform display.

The display control unit 31 drives the pixel driving circuit in the display unit 32 to perform predetermined display under the control of the CPU 30 connected thereto through the bus 26. For example, captured image data to be obtained by the above-described captured image signal processing unit 21 is displayed as a monitor image, or at the time of clip reproduction, image data obtained by the decoder 33 in the above-described manner is displayed.

The CPU 30 executes various kinds of control and operation processing based on a program stored in a memory unit 29 to control the entire video camera apparatus 3. The memory unit 29 collectively denotes various memories, such as a ROM (Read Only Memory), RAM (Random Access Memory), a flash memory, and the like, which are connected to the CPU.

The memory unit 29 stores a marking program 29*a* that causes the CPU 30 to execute a processing, which should be executed in implementation of an operation described below according to this embodiment.

An operation unit 27 is connected to the CPU 30. The operation unit 27 has operators provided so as to be exposed through an outer surface of a casing of the video camera apparatus 3, and gives a signal corresponding to an operator, on which an operation is made, to the CPU 30 as an operation input signal.

As the operators provided in the operation unit 27, for example, a recording start button for instructing to start clip recording, and a recording stop button for instructing to stop clip recording may be exemplified. As an operation input signal corresponding to the recording start button is supplied, the CPU 30 causes the encoder 22 to generate the TS packets or causes the media drive 25 to record the TS packets onto the optical disk D. When operation input information corresponding to the recording stop button is supplied, the CPU 30 causes the encoder 22 to stop generation of the TS packets, and causes the media drive 25 to record necessary information onto the optical disk D, thereby generating a clip file.

A clocking unit 28 is also connected to the CPU 30. Like the clocking unit 13, the clocking unit 28 clocks time in the form of "Year:Month:Day:Hour:Minute:Second".

A wireless communication unit 34 and a USB interface 35 are also connected to the CPU 30 through the bus 26.

The wireless communication unit 34 performs data communication with the external apparatus (particularly, in this case, the marker apparatus 2) in a wireless manner under the control of the CPU 30. The wireless communication unit 34 is also configured so as to perform wireless data communication with the external apparatus in the ad-hoc mode of wireless LAN (Wi-Fi ad-hoc mode).

The USB interface 35 performs data communication based on the USB system with the external apparatus (particular, in this case, the marker apparatus 2) connected thereto through a USB connection terminal 3A under the control of the CPU 30.

[Marking Operation of First Embodiment]

In the first embodiment, it is assumed that marking is carried out at the time of coverage.

Note that broadcasting contents are generally produced through a process including photographing of a motion image (video) as a source (coverage), and edition and processing of photographed source video. In the first embodiment, it is assumed that marking is carried out at the time of coverage in the broadcasting contents production process.

FIGS. 5A and 5B are diagrams schematically showing an operation in the marking system 1 of the first embodiment.

First, in implementation of the marking operation of this embodiment, as shown in FIG. 5A, before coverage, it is necessary to perform pairing between the marker apparatus 2 and the video camera apparatus 3 beforehand.

Specifically, the marker apparatus 2 is USB-connected to the video camera apparatus 3 that is used for coverage, clocked time synchronization is performed, and a marker ID (marker ID 11b) that is stored in the marker apparatus 2 is registered in the video camera apparatus 3.

In this example, for pairing, time synchronization and marker ID registration are performed mainly by the video camera apparatus 3.

Specifically, in this case, as a predetermined operation input is made, the video camera apparatus 3 displays a function display screen for display of information regarding functions mounted on the video camera apparatus 3 on the display unit 32. The user assigns a function of "Pairing" on the function display screen to instruct execution of pairing with the USB-connected marker apparatus 2.

In this example, as shown in FIG. 5A, it is assumed that pairing between the marker apparatus 2 and a plurality of video camera apparatuses 3 is executed.

In the video camera apparatus 3 of this embodiment, after the marker ID is registered through the above-described pairing, the registered marker ID is recorded in association with the recorded clip. In other words, the clip file recorded onto the optical disk D is associated with the marker apparatus 2 with which pairing is performed. Therefore, it is possible to identify which clip file recorded onto the optical disk D is recorded after pairing with which marker apparatus 2.

Specifically, the association between the clip file and the marker ID is implemented by recording information as a clip table shown in FIG. 6 onto the optical disk D.

As shown in the drawing, the clip table stores information about the marker ID registered through pairing and information about the clip No. of a clip file recorded onto the optical disk D with the corresponding marker ID registered. The information about a clip No. is No. information that, each time a clip is recorded, is put on the recorded clip by the CPU 30.

With the above-described data structure, the correspondence relationship regarding which clip recorded onto the optical disk D is recorded at the time of pairing with which marker apparatus 2 is represented.

As shown in the drawing, in addition to the information about the clip No. of each clip file, the clip table also stores information about the recording start time of the clip file specified by the clip No. That is, in this example, the clip table has a function to represent the correspondence relationship regarding which clip recorded onto the optical disk D is recorded after pairing with which marker apparatus 2, and a function to display information about the recording start time of each of the clips recorded onto the optical disk D.

As will be understood from a subsequent description, the information about the recording start time of each clip in the clip table is used to specify the correspondence relationship between the mark time and the clip.

For confirmation, a description will be provided for an operation to generate and record the clip table in the video camera apparatus 3.

In this case, if it is time that a clip should start to be recorded, the video camera apparatus 3 first acquires current time information clocked by the clocking unit 28. That is, information about a recording start time of a clip is acquired.

Thereafter, it is discriminated whether or not a clip is unrecorded onto the loaded optical disk D or the like. In this case, the video camera apparatus 3 reads out management information or the like to be recorded onto the optical disk D with the timing at which the optical disk D is loaded, and determines whether a clip table is recorded or unrecorded. When recording starts, the discrimination on whether or not a clip is unrecorded may be performed on the basis of information about the determination result.

If it is discriminated that a clip is unrecorded onto the optical disk D, it is necessary to newly generate a clip table. Accordingly, in this case, a new clip table in which the marker ID registered through pairing, No. information of a clip to be newly recorded, and the information about recording start time acquired in the above-described manner are stored is generated.

When a clip has already been recorded onto the optical disk D, there is a possibility that a clip table with a marker ID identical to the registered marker ID is recorded onto the optical disk D. In this case, it is discriminated whether or not there is a clip table with a marker ID identical to the registered marker ID from among the clip tables to be recorded onto the optical disk D. When there is a clip table with an identical marker ID, information with the acquired current time information is generated with respect to the corresponding clip table. For example, in a state where the clip table of FIG. 6 is recorded onto the optical disk D and the registered marker ID is "0001", if it is time that a new clip should start to be recorded, information with information about the clip No. 3 and the acquired information about recording start time is generated with respect to the clip table shown in FIG. 6.

When there is no clip table with a marker ID identical to the registered marker ID from among the clip tables to be recorded on the optical disk D, similarly to when a clip is unrecorded onto the optical disk D, a new clip table in which the registered marker ID, the clip No., and the recording start time are stored is generated.

In this instance, information about the newly generated clip table is recorded onto the optical disk D with a predetermined timing, for example, with the timing at which the clip recording operation ends.

As described above, when there is already a clip table with a marker ID identical to the registered marker ID in the optical disk D, the information contents of the corresponding clip table to be recorded onto the optical disk D are updated. This update is performed with a predetermined timing, for example, with the timing at which clip recording ends.

A further description will be provided with reference to FIGS. 5A and 5B.

FIG. 5B schematically shows the operation in the marking system 1, specifically, in each of the marker apparatus 2 and the video camera apparatus 3, at the time of coverage after the above-described pairing before coverage is performed.

Note that, at the time of coverage, each cameraman photographs (records) an object of coverage by the video camera apparatus 3 with the optical disk D loaded, and a person, such as a director or the like, other than the cameraman holds the marker apparatus 2 and operates a button of the marker apparatus 2 to execute an input to designate a marking timing.

In FIG. 5B, the marker apparatus 2 first acquires, as mark time information, time information when a button operation is made, as shown in <1> of the drawing. That is, as an operation of the mark button provided in the operation unit 12 described above is made, clocked time information of the clocking unit 13 with that timing is acquired as mark time information.

If the mark time information is acquired in such a manner, as shown in <2>, the acquired mark time information is added to the time list.

In this case, the marker apparatus 2 retains the mark time information acquired in accordance with the button operation as the time list with the structure shown in FIG. 7. That is, with the time list, the acquired mark time information is listed and retained, together with previous mark time information.

In the time list, information about the marker ID 11b stored in the memory unit 11 is put on the list of mark time information (in the drawing, "MarkerID="0001""). If the information about the marker ID 11b is included in the time list, the external apparatus that receives the corresponding time list can identify the marker apparatus 2 as the transmission source of the time list.

Returning to FIG. 5B, the marker apparatus 2 performs the operation of <2>, and also transmits the time list, as shown in <3>.

At the time of coverage, the video camera apparatus 3 is used to photograph the object, and accordingly it is difficult to USB-connect the marker apparatus 2 to the video camera apparatus 3. For this reason, at the time of coverage, the time list is transmitted through wireless communication using the wireless communication unit 14.

The time list may be transmitted when the mark button operation is made, but in this embodiment, the time list is automatically transmitted at a predetermined time interval, regardless of the mark button operation.

At the time of coverage, as described above, the time list is transmitted through wireless communication. For this reason, data communication may be failed due to elective wave conditions or the like. When the time list is transmitted only when the mark button operation is made, if transmission is failed, the video camera apparatus 3 cannot receive new mark time information. From this viewpoint, in this example, the time list is automatically transmitted at a predetermined time interval. Therefore, data retransmission can be tried after transmission is failed, and thus the video camera apparatus 3 can reliably receive the time list.

Next, the operation in the video camera apparatus 3 will be described.

At the time of coverage, as shown in <4>, if the time list transmitted from the marker apparatus 2 is received, the video camera apparatus 3 checks whether or not a marker ID is registered beforehand, as shown in <5>. That is, it is checked whether or not a marker ID attached to the received time list is identical to the marker ID at the time of pairing in FIG. 5A.

If the marker IDs are identical, it is determined that the marker apparatus 2 which transmits the time list is registered beforehand. Meanwhile, when the marker IDs are not identical, it is determined that the marker apparatus 2 which transmits the time list is not recorded beforehand.

Though not shown, when the marker IDs are not identical, marking based on the received time list is not carried out in order to prevent unintended marking. Specifically, in this case, if it is determined that the marker IDs are not identical, the video camera apparatus 3 waits until a new time list is received.

If it is determined that the marker IDs are identical, as shown in <6>, unacquired mark time information in the time list is first acquired. Thereafter, as shown in <7>, a clip corresponding to the mark time information is specified on the basis of the information contents of the clip table.

As will be understood from the description of FIG. 6, the clip table represents the recording start time of each of the clips recorded onto the optical disk D. Therefore, on the basis of the information contents of the clip table, it is possible to specify to which clip the acquired mark time information corresponds (the marking timing for which clip is represented by the acquired mark time information).

Specifically, the correspondence relationship between the acquired mark time information and the clip is specified in reference to the clip table with the registered marker ID and by specifying a clip, which is associated with a recording start time having a minimum time difference from the time represented by the acquired mark time information, from among the clips associated with a recording start time temporally earlier than the time represented by the acquired mark time information. In other words, a clip associated with a recording start time earlier than and temporally closest to the time represented by the acquired mark time information is specified.

In this case, synchronization between the clocked time in the marker apparatus 2 and the clocked time in the video camera apparatus 3 is made through the above-described pairing. Therefore, the correspondence relationship between the mark time information and the clip is accurately specified on the basis of the clip recording start time.

If the correspondence relationship between the mark time information acquired in the above-described manner and the clip is specified, as shown in <8>, mark time→time code conversion is performed. As described above, in this example, the time code is put as information representing the position on the time axis of the clip. From this viewpoint, like the mark table shown in FIG. 2, information about the mark position put on the clip is managed by the time code.

Under this situation, in this example, it is necessary to convert the acquired mark time information into information about the time code representing a time length elapsed since the recording start time of the corresponding clip.

The correspondence relationship between the pre-acquired mark time information and the clip is specified by the operation of <7>. Time code conversion in <8> is performed by calculating a difference between a time represented by the acquired mark time information and the recording start time of the corresponding clip in the clip table on the basis of information about the correspondence relationship.

If time code conversion is performed by the operation of <8>, as shown in <9>, the mark table is updated (generated).

When mark time information corresponding to a clip being currently recorded is initially acquired, there is no mark table for the clip being recorded. Therefore, in this case, a new mark table is generated on the basis of the acquired mark time information.

Specifically, a mark table in which the information about the time code obtained by time code conversion of the acquired mark time information and the information about the clip No. of the clip being recorded are stored is newly generated. As described above, in this example, the information "No Title" is stored as the title information for each mark position in the mark table.

When the acquired mark time information corresponds to the clip generated in the mark table beforehand, the time code information obtained by time code conversion of the acquired mark time information (and the information "No Title") is added to the existing mark table to update the mark table.

Note that, when the mark table is newly generated for the clip being recorded in the above-described manner, information about the generated mark table is recorded onto the optical disk D with a predetermined timing after clip recording ends, for example.

Even if the existing mark table is updated, while clip recording is being performed, the updated mark table cannot be recorded onto the optical disk D. For this reason, the mark table is recorded onto the optical disk D with a predetermined timing after clip recording ends.

In the above-described manner, according to the marking system 1 of this embodiment, the marking timing on a clip can be designated by the marker apparatus 2 provided separately from the video camera apparatus 3.

Accordingly, the marking timing can be designated by a person, other than a cameraman, who holds the marker apparatus 2. As a result, the marking timing can be designated reliably and with appropriate timing, as compared with a case where the cameraman should operate the mark button provided in the camera main body to designate the marking timing, like in the known coverage system.

In this embodiment, clocked time synchronization is performed beforehand between the marker apparatus 2 and the video camera apparatus 3. If time synchronization is performed beforehand, the marking position accuracy can be increased.

Specifically, in this embodiment, while the mark position on the clip is managed by the time code, if time synchronization is performed beforehand, time code conversion is accurately performed on the basis of the information about the recording start time of the clip. As a result, the marking position accuracy is improved.

In this embodiment, the marker ID 11*b* is allocated to the marker apparatus 2, and the marker ID 11*b* is registered in the video camera apparatus 3 beforehand. Marking is carried out on the clip only on the basis of the mark time information from the marker apparatus 2 with a marker ID identical to the registered marker ID 11*b*.

Therefore, unintended marking is prevented from being carried out based on mark time information transmitted from the marker apparatus 2, which is not registered beforehand.

In this embodiment, the marker apparatus 2 transmits the mark time information in the form of a list, together with previous mark time information acquired by the button operation. Therefore, reception leakage of mark time information in the video camera apparatus 3 is prevented. From this viewpoint, accurate marking is carried out.

[Processing Procedure]

Next, a processing procedure that should be executed in implementation of the above-described operation of the first embodiment will be described with reference to flowcharts of FIGS. 8 to 11.

In the flowcharts of FIGS. 8 to 11, the processing procedure in the marker apparatus 2 corresponds to a processing procedure to be executed by the CPU 10 on the basis of the control program 11*a*. The processing procedure in the video camera apparatus 3 corresponds to a processing procedure to be executed by the CPU 30 on the basis of the marking program.

Figure 8:
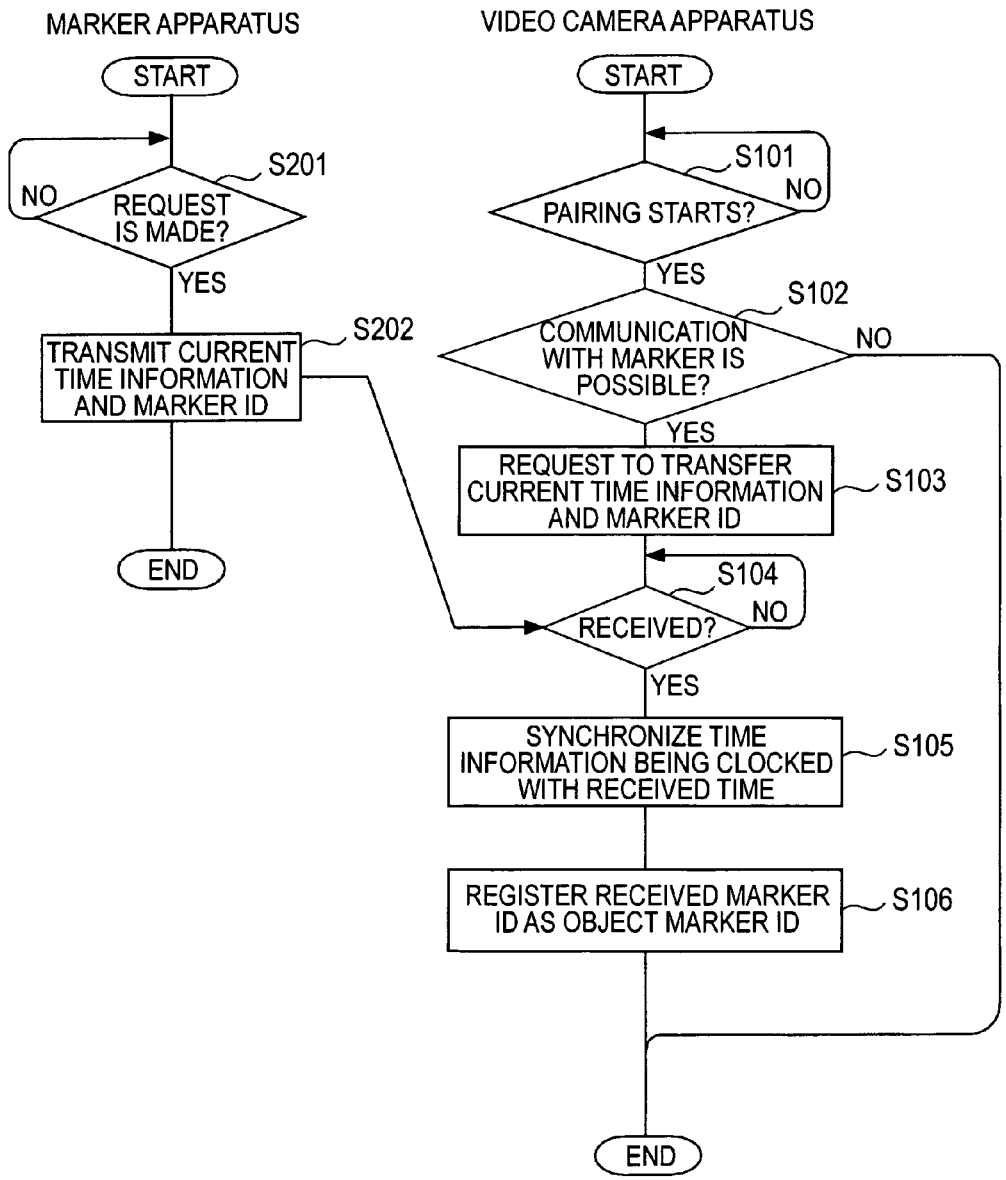
FIG. 8 is a flowchart showing a procedure of a processing which should be executed in the marking system of the embodiment at the time of pairing before coverage.

FIG. 8 shows a processing procedure that should be executed at the time of pairing before coverage, which has been described with reference to FIG. 5A.

First, in Step S101 of the drawing, the video camera apparatus 3 waits until it is time that pairing should start. As described above, the pairing start instruction is carried out by assigning the function item "Pairing" on the function display screen to be displayed by the video camera apparatus 3. For this reason, in Step S101, the process waits until an operation to assign the item "Pairing" on the function display screen is made.

When the item "Pairing" is assigned and it is time that pairing should start, in Step S102, it is discriminated whether or not communication with the marker apparatus 2 is possible. That is, it is discriminated whether or not the USB connection terminal 2A of the marker apparatus 2 is connected to the USB connection terminal 3A shown in FIG. 4, and communication with the marker apparatus 2 is possible.

In Step S102, when a negative result is obtained that communication with the marker apparatus 2 is not possible, as shown in the drawing, the processing operation shown in the drawing ends.

In Step S102, when a positive result is obtained that communication with the marker apparatus 2 is possible, the process progresses to Step S103, and a transfer request for the current time information and the marker ID is made. That is, the USB interface 35 is controlled such that the request to transfer (transmit) the current time information and the marker ID is made for the marker apparatus 2.

In Step S201 of the drawing, the marker apparatus 2 waits for the transfer request from the video camera apparatus 3. When the transfer request is made, in Step S202, a transfer processing of the current time information and the marker ID is executed. That is, the USB interface 15 is controlled such that the current time information clocked by the clocking unit 13 and the information about the marker ID 11*b* stored in the memory unit 11 are transferred (transmitted) to the video camera apparatus 3.

After the transfer processing of Step S202 is executed, the processing procedure in the marker apparatus 2 shown in the drawing ends.

After the transfer request is made in Step S103, in Step S104 of the drawing, the video camera apparatus 3 waits until various kinds of information (the current time information and the marker ID 11*b*) are received from the marker apparatus 2.

When the current time information and the information about the marker ID 11*b* are received from the marker apparatus 2, in Step S105, synchronization between time information being clocked and the received time is executed. That is, the clocked time information of the clocking unit 28 is corrected on the basis of the time information received from the marker apparatus 2.

Next, in Step S106, a processing to register the received marker ID as an object marker ID is executed. That is, the received marker ID 11*b* is registered as ID information regarding the marker apparatus 2 subject to pairing.

After Step S106 is executed, the processing operation shown in the drawing ends.

Figure 9:
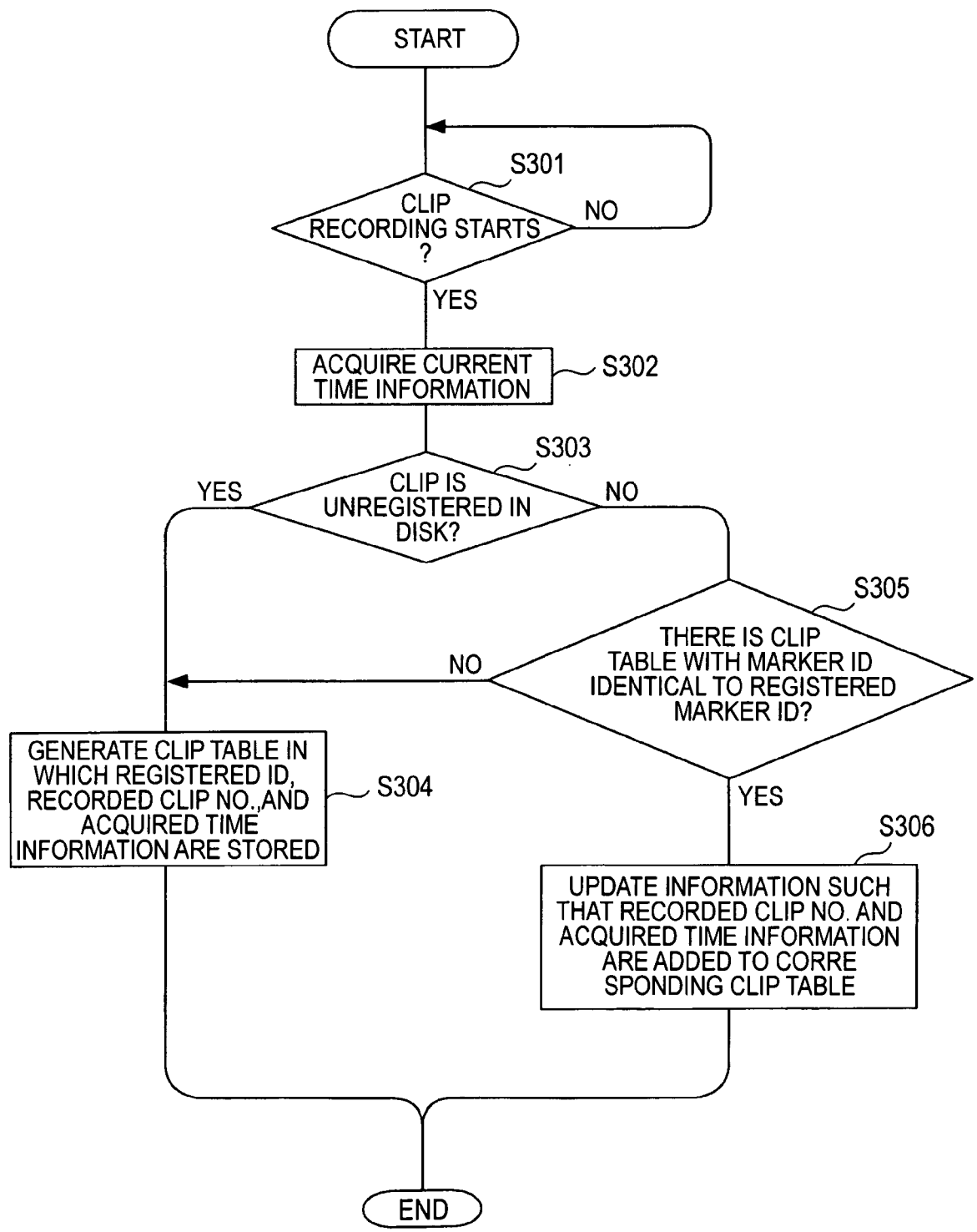
FIG. 9 is a flowchart showing a procedure of a processing which should be executed in the signal processing apparatus of the embodiment when a clip table is generated.

FIG. 9 shows a processing procedure to generate a clip table in the video camera apparatus 3.

In FIG. 9, in Step S301, it first waits until it is time that clip recording should start. As described above, clip recording onto the optical disk D starts in accordance with the operation of the recording start button provided in the operation unit 27.

Therefore, in Step S301, it waits until operation input information according to the recording start button is supplied from the operation unit 27.

When the operation of the recording start button is made and it is time that clip recording should start, in Step S302, a processing to acquire current time information is executed. That is, the current time information clocked by the clocking unit 28 is acquired. The current time information acquired in Step S302 may be handled as the information about recording start time of the clip.

Next, in Step S303, it is discriminated whether or not a clip is unrecorded onto the optical disk D.

In the above-described manner, the video camera apparatus 3 reads out management information or the like recorded onto the optical disk D with the timing at which the optical disk D is loaded, and determines whether the clip table is recorded or unrecorded. The determination processing in Step S303 is executed on the basis of information about the preliminary determination result.

In Step S303, when a positive result is obtained that a clip table is not recorded onto the optical disk D, and a clip is unrecorded, the process progresses to Step S305, and a clip table in which the registered ID, the recorded clip No., and the acquired time information are stored is generated. That is, a clip table in which the information about the marker ID registered in Step S106 of FIG. 8, the information about the clip No. allocated to the clip being currently recorded, and the time information (recording start time information) acquired in Step S302 are stored in the format shown in FIG. 6 is generated.

After Step S305 is executed, the processing operation shown in the drawing ends.

In Step S303, when a negative result is obtained that a clip table is recorded onto the optical disk D, and a clip is recorded, the process progresses to Step S304, and it is discriminated whether or not there is a clip table with a marker ID identical to the registered marker ID.

As the information about the clip table to be used in Step S304, information which is read by reading the above-described management information at the time of disc loading and retained in the memory unit 29 is used.

In Step S304, when a negative result is obtained that there is no clip table with a marker ID identical to the registered marker ID, the process progresses to Step S305 described above, and a new clip table with the registered marker ID is generated.

In Step S304, when a positive result is obtained that there is a clip table with a marker ID identical to the registered marker ID, the process progresses to Step S306, and information update is performed so as to add the recorded clip No. and the acquired time information to the corresponding clip table. That is, the information contents of the corresponding clip table are updated such that the information about the clip No. allocated to the clip being currently recorded and the time information (recording start time information) acquired in Step S302 are added to the corresponding clip table that is read out from the optical disk D and retained in the memory unit 29 beforehand (a clip table with a marker ID identical to the registered marker ID).

After Step S306 is executed, the processing operation shown in the drawing ends.

Though not shown, as described above, the information about the clip table newly generated when clip recording starts is recorded onto the optical disk D with a predetermined timing, for example, with the timing at which clip recording ends. Specifically, the CPU 30 controls the media drive 25 such that the clip table generated in Step S305 is recorded onto the optical disk D when clip recording ends.

Even if the information contents of the clip table with a marker ID identical to the registered marker ID are updated in Step S306, the information about the updated clip table is recorded onto the optical disk D with a predetermined timing, such as, with the timing at which clip recording ends.

Figure 10:
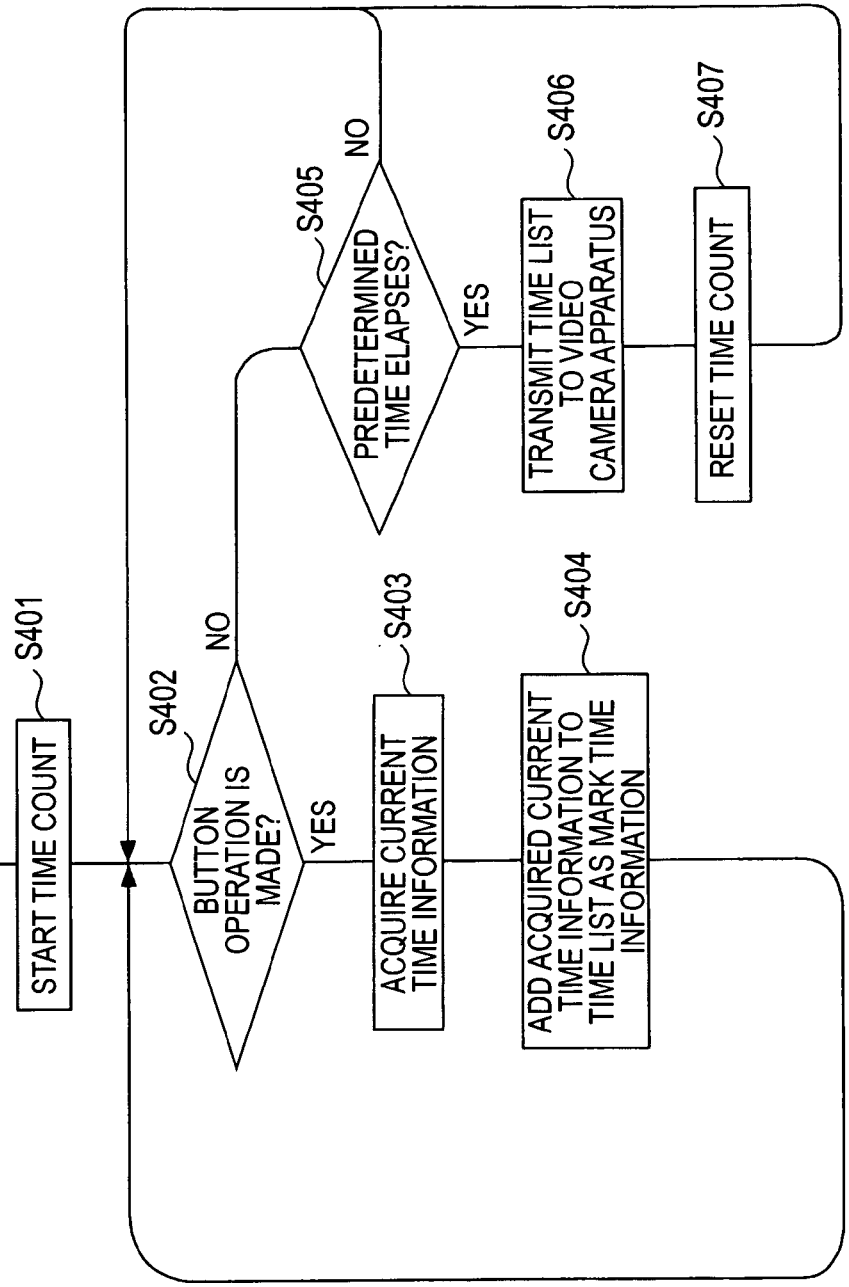
FIG. 10 is a flowchart showing a procedure of a processing which should be executed in the terminal apparatus of the first embodiment at the time of coverage.

FIG. 10 shows a processing procedure in the marker apparatus 2 at the time of coverage.

As described above, at the time of coverage, the marker apparatus 2 transmits the time list at a predetermined time interval. For this reason, in Step S401 of the drawing, time count first starts.

Next, in Step S402, it is discriminated whether or not a button operation is made. That is, it is discriminated whether or not an operation input signal corresponding to the above-described mark button is supplied from the operation unit 12.

In Step S402, when a positive result is obtained that the operation input signal corresponding to the mark button is supplied and the button operation is made, the process progresses to Step S403, and the current time information clocked by the clocking unit 13 is acquired.

Next, in Step S404, an addition processing of the acquired current time information to the time list as the mark time information is executed.

In the processing of Step S404, when a time list is not generated, the mark time information is not "added" to the existing time list, but a time list in which the marker ID 11b and the acquired time information are stored in the format shown in FIG. 7 is newly generated.

After Step S404 is executed, as shown in the drawing, the process returns to the button operation standby processing of Step S402, and accordingly a time list is added to the mark time information each time button operation is made.

In Step S402, when a negative result is obtained that the operation input signal corresponding to the mark button is not supplied and button operation is not made, the process progresses to Step S405, and it is discriminated whether or not a predetermined time elapses.

In Step S405, when a negative result is obtained that the predetermined time does not elapse, the process progresses to Step S402.

In Step S405, when a positive result is obtained that the predetermined time elapses, the process progresses to Step S406, and a processing to transmit the time list to the video camera apparatus is executed. That is, the wireless communication unit 14 is controlled to transmit the time list to the video camera apparatus 3.

After Step S407 is executed, the process returns to Step S402.

Figure 11:
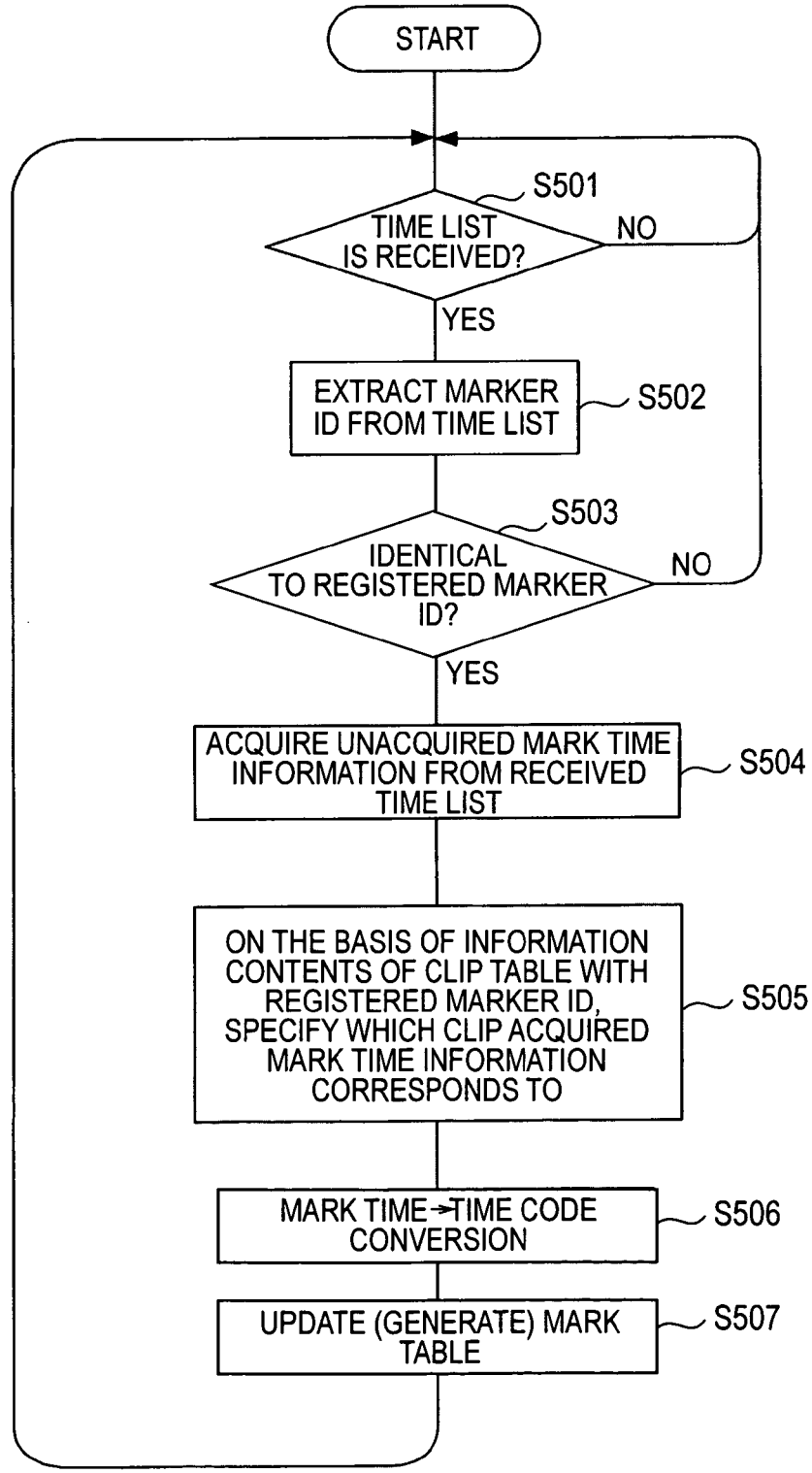
FIG. 11 is a flowchart showing a procedure of a processing which should be executed in the signal processing apparatus of the first embodiment at the time of coverage.

FIG. 11 shows a processing procedure in the video camera apparatus 3 at the time of coverage.

Referring to FIG. 11, in Step S501, it first waits until a time list is received. When a time list is received from the marker apparatus 2 through the wireless communication unit 34, the process progress to Step S502, and a marker ID is extracted from the time list.

Next, in Step S503, it is discriminated whether or not the marker ID is identical to the registered marker ID. That is, it is discriminated whether or not the marker ID extracted (acquired) in Step S502 is identical to the marker ID registered in Step S106 of FIG. 8.

In Step S503, when a negative result is obtained that the marker IDs are not identical, the process returns to Step S501. Therefore, unintended marking is prevented from being carried out on the basis of the time list from the marker apparatus 2 which is not registered beforehand.

In Step S503, when a positive result is obtained that the marker IDs are identical, the process progresses to Step S504, and unacquired mark time information is acquired from the received time list.

Next, in Step S505, a processing to specify a clip corresponding to the acquired mark time information is executed on the basis of the information contents of the clip table with the registered marker ID.

As described above, the correspondence relationship of the acquired mark time information and the clip is specified in reference to the clip table with the registered marker ID and by specifying a clip, which is associated with a recording start time having a minimum time difference from the time represented by the acquired mark time information, from among the clips associated with a recording start time temporally earlier than the time represented by the acquired mark time information.

Next, in Step S506, mark time→time code conversion is performed. That is, the time length of a difference between the time represented by the acquired mark time information and the recording start time of the clip stored in the clip table corresponding to the acquired mark time information is calculated to obtain time code information.

Next, in Step S507, the mark table is updated (generated). As described above, when the mark time information corresponding to the clip being currently recorded is initially acquired, there is no mark table for the clip being recorded. Therefore, a new mark table is generated on the basis of the acquired mark time information. Specifically, a mark table in which the time code information obtained by time code conversion of the acquired mark time information and the information about the clip No. allocated to the clip being recorded are stored is generated. In this case, the information "No Title" is stored as the title information for each mark position in the mark table.

When the acquired mark time information corresponds to the clip generated in the mark table beforehand, the mark table is updated such that the time code information obtained by time code conversion of the acquired mark time information (and the information "No Title") is added to the mark table of the clip.

As will be described below, when a mark table is newly generated for the clip being recorded in the above-described manner, the information about the generated mark table is recorded onto the optical disk D with a predetermined timing after clip recording ends, for example. Specifically, in this case, the CPU 30 controls the media drive 25 such that the information about the newly generated mark table is recorded onto the optical disk D when clip recording ends.

Even if the mark table is updated, while a clip is being recorded, the mark table is recorded onto the optical disk D when clip recording ends.

After Step S507 is executed, the process returns to Step S501, and accordingly it waits until a time list is received from the marker apparatus 2 again.

Second Embodiment

Next, a second embodiment will be described.

In the second embodiment, unlike the first embodiment in which marking is carried out at the time of coverage, marking is carried out after coverage.

While during coverage, it is necessary to transmit a time list from a marker apparatus to a video camera apparatus 3 in a wireless manner, after coverage, a time list may be transmitted in a wired manner. From this viewpoint, in the following description, a case where transmission of a time list after coverage is performed through USB connection of the marker apparatus and the video camera apparatus will be described.

Figure 12:
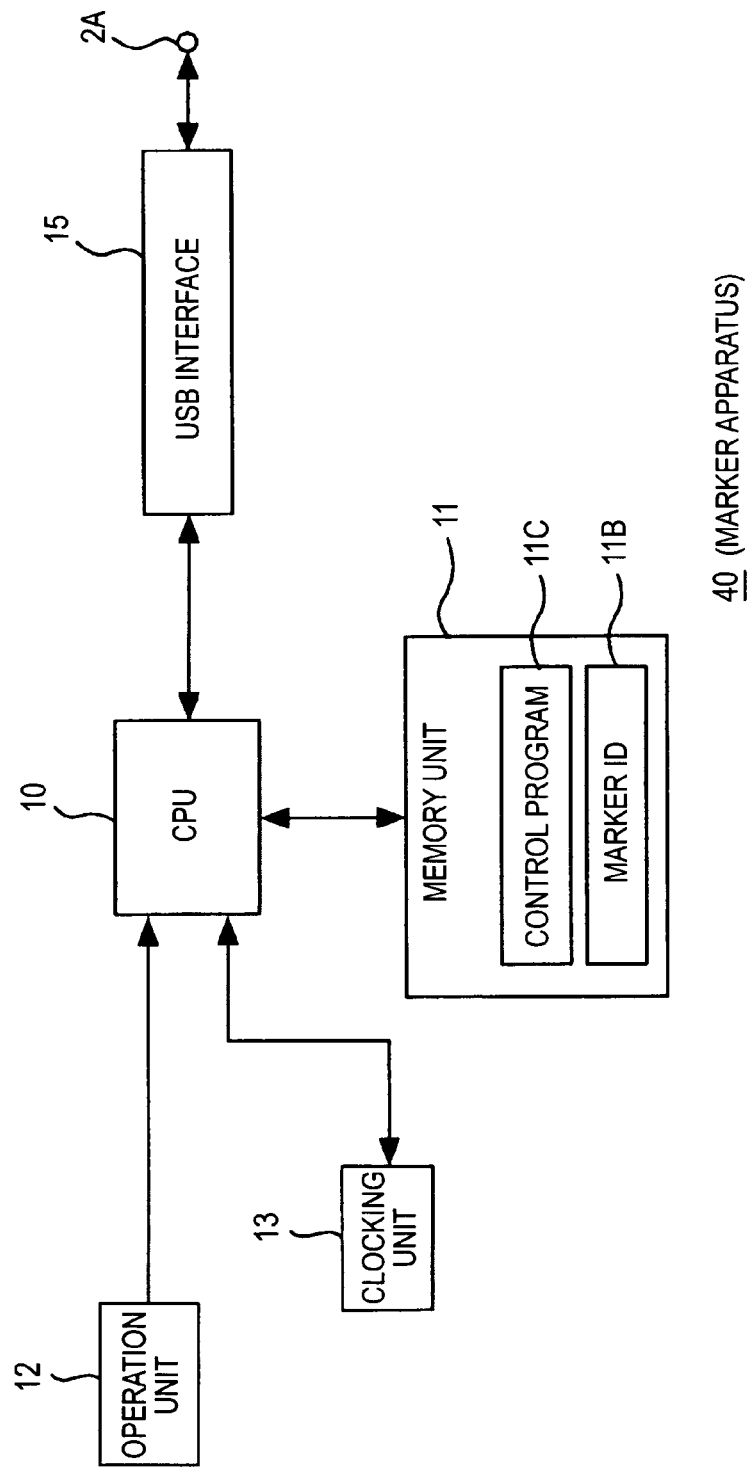
FIG. 12 is a block diagram showing the internal configuration of a terminal apparatus according to a second embodiment of the invention.
Figure 13:
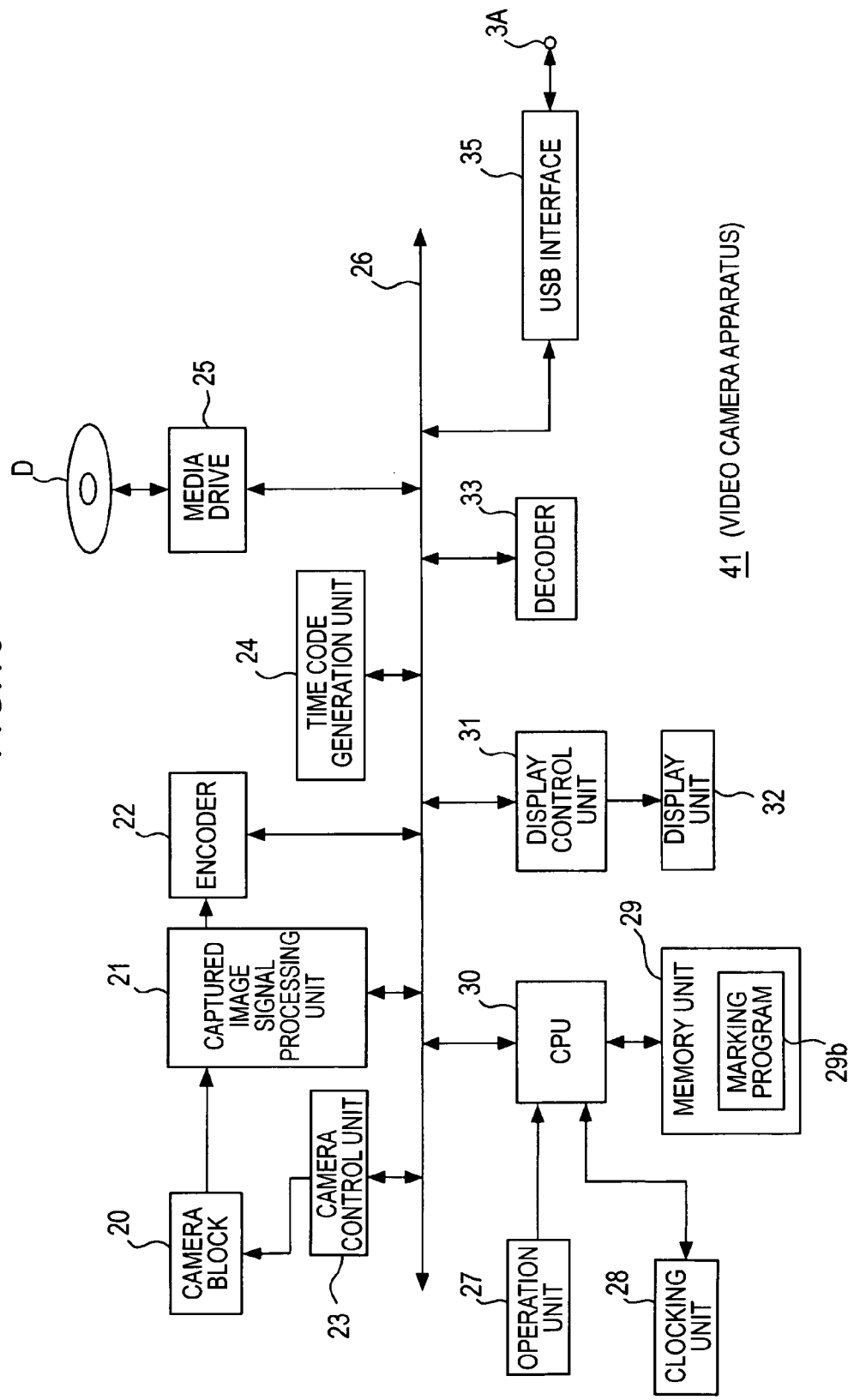
FIG. 13 is a block diagram showing the internal configuration of a signal processing apparatus according to the second embodiment.

FIG. 12 shows the internal configuration of a marker apparatus 40 of the second embodiment. FIG. 13 shows the internal configuration of a video camera apparatus 41 of the second embodiment. In FIGS. 12 and 13, the same parts as those described in the first embodiment are represented by the same reference numerals, and descriptions thereof will be omitted.

In FIG. 12, the marker apparatus 40 is different from the marker apparatus 2 shown in FIG. 3 in that no wireless communication unit 14 is provided. There is also a difference in that, instead of the control program 11a of the memory unit 11, a control program 11c that causes the CPU 10 to execute a processing, which should be executed in implementation of an operation described below of the second embodiment, is stored.

In FIG. 13, the video camera apparatus 41 is different from the video camera apparatus 3 shown in FIG. 4 in that no wireless communication unit 34 is provided, and instead of the marking program 29a, a marking program 29b that causes the CPU 30 to execute a processing, which should be executed in implementation of an operation of the second embodiment, is stored.

FIGS. 14A and 14B are diagrams schematically showing an operation of the second embodiment.

FIG. 14A schematically shows the operation in the marker apparatus 40 at the time of coverage. FIG. 14B schematically shows the operation of the marker apparatus 40 and the video camera apparatus 41 after coverage.

Though not shown, in this case, before coverage, the same pairing as described in the first embodiment is executed between the marker apparatus 40 and the video camera apparatus 41. That is, before coverage, clocked time synchronization is performed between the marker apparatus 40 and the video camera apparatus 41, and the marker ID of the marker apparatus 40 is registered with respect to the video camera apparatus 41.

Referring to FIG. 14A, at the time of coverage, the operation of the marker apparatus 40 is different from the operation of the marker apparatus 2 according to the first embodiment at the time of coverage in that the operation to transmit the time list at a predetermined time interval is not provided. That is, as shown in FIG. 14A, at the time of coverage, the marker apparatus 40 performs only an operation to acquire time information at the time of button operation as mark time information (<1> in the drawing), and an operation to add the mark time information to the time list (<2> in the drawing).

In the second embodiment, after coverage, the marker apparatus 40 is USB-connected to the video camera apparatus 41, such that the time list in the marker apparatus 40 is transmitted (transferred) to the video camera apparatus 41.

In FIG. 14B, after coverage, the video camera apparatus 41 requests the marker apparatus 40 to transfer the time list, as shown in <1>.

In this instance, in the video camera apparatus 41, the transfer request is made on the basis of the user's operation. Specifically, in this case, the video camera apparatus 41 has a function to display the same function display screen as described above, and the function item "Time List Import" is displayed in the function display screen. In the video camera apparatus 41, when the item "Time List Import" is assigned by the user's operation in a state where the function display screen is displayed, the transfer request of the time list to the marker apparatus 40 is made.

When the transfer request of the time list is made from the video camera apparatus 41, the marker apparatus 40 transfers the time list to the video camera apparatus 41, as shown in <2>.

If the time list is received in <3> of the drawing, the video camera apparatus 41 checks whether or not a marker ID is registered beforehand, as shown in <4>. That is, in this case, it is assumed that pairing is performed beforehand between the marker apparatus 40 and the video camera apparatus 41 in the above-described manner. For this reason, it is checked whether or not the marker ID registered through pairing and the marker ID extracted from the received time list are identical.

In this case, when the received marker ID is not identical to the registered marker ID, marking is not carried out on the basis of the received time list. With the authentication based on the registered marker ID, in this case, unintended marking is also prevented.

In the second embodiment in which marking is carried out after coverage, the user connects the marker apparatus 40 to the video camera apparatus 41 for marking on a clip recorded onto the optical disk D loaded in the video camera apparatus 41. In this case, if any notification is not made and marking is not carried out as described above, the user may be confused.

Accordingly, in the second embodiment, as described above, when the marker IDs are not identical, a notification purporting that an incorrect marker apparatus 40 not paired beforehand is connected is made to the user (not shown). Specifically, a predetermined message, for example, "It is not a paired marker." or the like, is displayed on the display unit 32. Therefore, a notification that marking is not carried out and the reasons can be appropriately made to the user, and thus the user can be prevented from being confused.

When the marker IDs are identical, marking is carried out on the basis of the received time list by the operations in <5> and later of the drawing. Specifically, marking is performed for a clip recorded onto the optical disk D at the time of coverage by the operation in <5> to specify the correspondence relationship between the mark time information in the time list and the clip, the mark time→time code conversion operation in <6>, and the operation in <7> to update (generate) the mark table.

The operations in <5> to <7> are the same as those in the first embodiment, and thus further descriptions thereof will be omitted.

In this way, according to the second embodiment, the video camera apparatus 41 can execute collective marking after coverage on the basis of the mark time information accumulated by the marker apparatus 40 at the time of coverage.

A processing procedure in implementation of the operation described above according to the second embodiment will be described with reference to flowcharts of FIGS. 15 and 16.

Note that, in this case, a processing for pairing before coverage shown in FIG. 8 is performed for the marker apparatus 40 and the video camera apparatus 41.

In this case, similarly to the video camera apparatus 3 of the first embodiment, the video camera apparatus 41 also generates the clip table shown in FIG. 9 and records the generated clip table onto the optical disk D.

FIG. 15 shows a procedure of a processing which should be executed in the marker apparatus 40 at the time of coverage. In FIG. 15, the processing procedure which should be executed in the marker apparatus 40 at the time of coverage corresponds to the processing procedure to be executed by the CPU 10 shown in FIG. 12 on the basis of the control program 11c in the memory unit 11.

As will be understood by comparison of the processing procedure shown in FIG. 15 and the processing procedure shown in FIG. 10, the processing procedure by the marker apparatus 40 at the time of coverage corresponds to a processing procedure in which a processing to transmit a time list at a predetermined time interval is removed from the processing procedure at the time of coverage shown in FIG. 10.

Specifically, in Step S601 of the drawing, it waits until a button operation (mark button operation) is made, and if the button operation is made, in Step S602, current time information is acquired. Thereafter, in Step S603, the acquired current time information is added to the time list as mark time information. After Step S603 is executed, the process returns to the standby processing of Step S601.

Steps S602 and S603 are the same as Steps S403 and S404 described with reference to FIG. 10, and thus further descriptions thereof will be omitted.

FIG. 16 shows a processing procedure that should be executed in the marker apparatus 40 and the video camera apparatus 41 after coverage.

In FIG. 16, the processing procedure that should be executed in the marker apparatus 40 corresponds to the processing procedure to be executed by the CPU 10 shown in FIG. 12 on the basis of the control program 11c in the memory unit 11. The processing procedure that should be executed in the video camera apparatus 41 corresponds to the processing procedure to be executed by the CPU 30 shown in FIG. 13 on the basis of the marking program 29b in the memory unit 29.

In Step S801 of the drawing, the video camera apparatus 41 first waits until it is time that import should start. That is, it waits until a prescribed trigger to start to import the time list from the marker apparatus 40 occurs, for example, the function item "Time List Import" is assigned in a state where the above-described function display screen is displayed.

When a predetermined trigger occurs, for example, the function item "Time List Import" is assigned by the user's operation, in Step S802, it is discriminated whether or not communication with the marker apparatus 40 is possible. That is, it is discriminated whether or not the USB connection terminal 2A of the marker apparatus 40 is connected to the USB connection terminal 3A shown in FIG. 13, and communication with the marker apparatus 40 is possible.

In Step S802, when a negative result is obtained that communication with the marker apparatus 40 is not possible, as shown in the drawing, the processing operation shown in the drawing ends.

In Step S802, when a positive result is obtained that communication with the marker apparatus 40 is possible, the process progresses to Step S803, and a transfer request for the time list is made to the marker apparatus 40. That is, the USB interface 35 is controlled such that the transfer request for the time list is made to the marker apparatus 40.

In Step S701 of the drawing, the marker apparatus 40 waits for the transfer request from the video camera apparatus 41. When the transfer request is made, in Step S702, the time list is transferred. That is, the USB interface 15 is controlled such that information about the time code which is generated (updated) through the processing shown in FIG. 15 and retained, for example, in the memory unit 11 is transferred (transmitted) to the video camera apparatus 41.

After the transfer processing of Step S702 is executed, the processing operation of the marker apparatus 40 shown in the drawing ends.

After the transfer request is made in Step S803, in Step S804 of the drawing, the video camera apparatus 41 waits until the information about the time list is received from the marker apparatus 40.

When the information about the time list is received from the marker apparatus 40, in Step S805, a marker ID is extracted from the received time list, and in Step S806, it is discriminated whether or not the marker ID is identical to the registered marker ID. That is, it is discriminated whether or not the marker ID registered through pairing before coverage and the marker ID extracted in Step S805 are identical.

In Step S806, when a negative result is obtained that the marker IDs are not identical, the process progresses to Step S811, and an error processing is executed. In the error processing of Step S811, an instruction is made to the display control unit 31 such that, for example, a predetermined message, "It is not a paired marker." is displayed on the display unit 32.

With this error processing, a notification purporting that the connected marker apparatus 40 is not paired beforehand, and marking is not carried out can be made, and as a result, the user can be prevented from being confused.

In Step S806, when a positive result is obtained that the marker IDs are identical, the process progresses to Step S807, and a processing for marking based on the received time list is executed through Steps S807 to S810.

The processing for marking based on the received time list through Steps S807 to S810 is the same as the processing through Steps S504 to S507 described with reference to FIG. 11, and thus a further description thereof will be omitted.

Meanwhile, in the second embodiment, after coverage, the user connects the marker apparatus 40 to the video camera apparatus 41 so as to perform marking. Accordingly, it may not be assumed that, like the first embodiment, Steps S807 to S810 are executed while a clip is being recorded onto the optical disk D. For this reason, in the second embodiment, the information about the mark table updated (generated) in Step S810 can be immediately recorded onto the optical disk D. Alternatively, the mark table to be recorded onto the optical disk D may be directly updated.

In the above description, with respect to marking after coverage, marking (mark table update/generation and mark table recording onto the optical disk D) is carried out by the video camera apparatus 41. Alternatively, marking after coverage may be carried out by an edition instrument 45, which is used to edit a clip recorded by the video camera apparatus 41.

FIG. 17 is a diagram schematically showing an operation when marking is carried out by the edition instrument 45.

As shown in FIG. 17, even though marking is carried out by the edition instrument 45 after coverage, pairing is first performed between the marker apparatus 40 and the video camera apparatus 41 before coverage. That is, time synchronization between the marker apparatus 40 and the video camera apparatus 41 is performed, and the marker ID 11b to be stored in the marker apparatus 40 is registered in the video camera apparatus 41.

In this case, at the time of coverage, the user operates the mark button of the marker apparatus 40 to designate the marking timing, to thereby cause the marker apparatus 40 to generate the time list. The operation till coverage is the same as described with reference to FIG. 14A.

At the time of coverage, the video camera apparatus 41 records the clip table onto the optical disk D in accordance with clip recording (see the flowchart of FIG. 9). Accordingly, with respect to the optical disk D, a clip to be recoded onto the optical disk D, the recording start time of the clip, and information indicating the clip is recorded after pairing with which marker apparatus 40 are recorded onto the optical disk D.

Note that, in this case, pairing is performed beforehand between the marker apparatus 40 and the video camera apparatus 41, and as a result, the information about the recording start time in the clip table can be based on the time synchronized with the marker apparatus 40.

The edition instrument 45 carries out marking on the clip to be recorded onto the loaded optical disk D using information about the clip table to be recorded onto the optical disk D in such a manner.

Specifically, in this case, after coverage, the marker apparatus 40 is USB-connected to the edition instrument 45. The edition instrument 45 also has a function to display the same function display screen as described above, and the function item "Time List Import" is displayed in the function display screen. In the edition instrument 45, if the item "Time List Import" is assigned by the user's operation, a transfer request for a time list is made to the marker apparatus 40.

In this way, the marking operation on the clip to be recorded onto the loaded optical disk D after the request for the time list is made is the same as the operation in the video camera apparatus 41 described with reference to FIG. 14B, and thus a further description thereof will be omitted.

Meanwhile, in this case, preliminary pairing with the marker apparatus 40 is performed with respect to the video camera apparatus 41, and accordingly there is no information about the registered marker ID in the edition instrument 45. From this viewpoint, in the edition instrument 45, the operation in <4> shown in FIG. 14B (the operation to check whether or not the marker ID is registered beforehand) is not executed.

Alternatively, in this case, as the operation in <5> to specify the correspondence relationship, on the basis of the information contents of the clip table with a marker ID identical to a marker ID in the time list, it is specified which clip the respective mark time information in the time list corresponds to. Accordingly, a clip to be marked is limited to clips that are recorded by the video camera apparatus 41 which is paired beforehand with the marker apparatus 40 connected to the edition instrument 45, and as a result, marking can be prevented from being carried out on an unintended clip.

Figure 18:
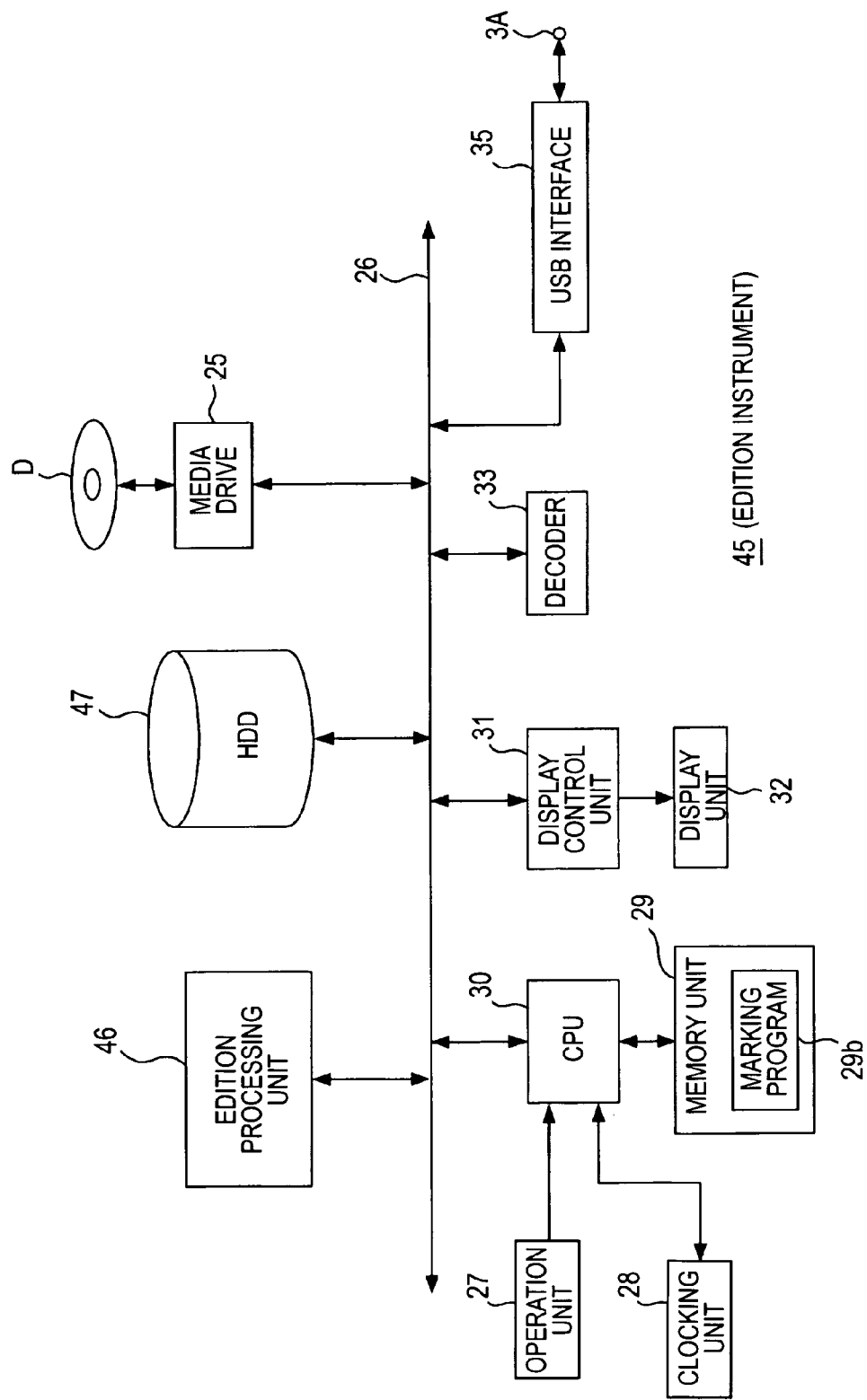
FIG. 18 is a block diagram showing the internal configuration of an edition instrument.

FIG. 18 is a block diagram showing the internal configuration of the edition instrument 45 in implementation of the above-described operation.

In FIG. 18, the same parts as those described above are represented by the same reference numerals, and descriptions thereof will be omitted.

In the edition instrument 45, as compared with the video camera apparatus 41 shown in FIG. 13, the camera block 20, the captured image signal processing unit 21, the encoder 22, the camera control unit 23, and the time code generation unit 24 are removed, and an edition processing unit 46 and an HDD (Hard Disc Drive) 47 are added.

The edition processing unit 46 and the HDD 47 are connected to the CPU 30 through the bus 26.

The edition processing unit 46 performs edition for the clips recorded onto the optical disk D. The contents of the edition may include, for example, cutting of assigned sections, clip linking, and the like.

The HDD 47 stores various kinds of data in accordance with an instruction of the CPU 30. For example, the HDD 47 is used to store the clips after edition by the edition processing unit 46.

In this case, in implementation of the operation in the edition instrument 45 described with reference to FIG. 17, the CPU 30 executes processing on the basis of the marking program 29b. The processing that should be executed by the edition instrument 45 for marking is just the same as the processing of the video camera apparatus 41 shown in FIG. 16, and the processing for preliminary pairing does not need to be executed. That is, in this case, in the marking program 29b, a program that executes the processing for preliminary pairing with the marker apparatus 40 (the processing of the video camera apparatus in FIG. 8) is omitted.

With this configuration, in the edition instrument 45, preliminary registration is not executed with respect to the marker apparatus 40. For this reason, the discrimination in Step S804 and the error processing in Step S811 are omitted. In addition, in Step S808, rather than that "on the basis of the information contents of the clip table with a marker ID identical to the registered marker ID, it is specified which clip the acquired mark time information corresponds to", "on the basis of the information contents of the clip table with a marker ID identical to a marker ID extracted from the time list, it is specified which clip the acquired mark time information corresponds to".

As will be understood from the above description, when marking is carried out by the edition instrument 45 after coverage, it is characterized that pairing is performed between the marker apparatus 40 and the video camera apparatus 41, and the video camera apparatus 41 generates and records the clip table (including the registered marker ID). Accordingly, the clip table with a maker ID of the pre-registered marker apparatus 40 can be recorded onto the optical disk D to be loaded in the edition instrument 45 after coverage. As a result, on the basis of the information about the clip table recorded onto the optical disk D and using the marker ID of the connected marker apparatus 40, in the edition instrument 45, marking can be prevented from being carried out on an unintended clip.

<Modifications>

While the embodiments of the invention have been described above, the invention should not be limited to the specific examples described above.

For example, with respect to a clip marking method, the invention should not be limited to the format of the mark table described above. Marking may be carried out by other methods.

In the above description, as the first embodiment, when marking is carried out at the time of coverage, authentication using the registered marker ID (check whether or not information about the received marker ID is identical to the registered marker ID) is executed. Alternatively, in the first embodiment, the authentication by the registered marker ID may be omitted.

As described above, if pairing is performed beforehand with the marker apparatus 2, the marker ID of the paired marker apparatus 2 can be put on the clip table. From this viewpoint, at the time of coverage, if the correspondence relationship is specified only for a clip table with a marker ID identical to the registered marker ID in Step S505 of FIG. 11, marking based on the mark time information from the marker apparatus 2, which is not registered beforehand, can be automatically prevented. Therefore, marking can be prevented from being carried out on an unintended clip, and as a result, the authentication using the registered marker ID (Step S503 of FIG. 11) can be omitted.

In other words, this represents that, when marking is carried out at the time of coverage, it is not necessary to put the registered marker ID on the clip table. That is, when marking is carried out at the time of coverage, if the authentication using the registered marker ID is performed, even though a time list is received from another marker apparatus 2 which is not registered beforehand, the processing to specify the correspondence relationship in Step S505 and later is not executed. For this reason, in Step S505, the correspondence relationship is simply specified only on the basis of the recording start time information in the clip table. As a result, an appropriate correspondence relationship can be specified. From this viewpoint, when marking is carried out at the time of coverage, it is not necessary to put the registered marker ID on the clip table.

The same is applied to a case where the video camera apparatus 41 performs marking after coverage.

That is, even when the video camera apparatus 41 performs marking after coverage, in Step S808 of FIG. 16, "on the basis of the information contents of the clip table with the registered marker ID, it is specified which clip the acquired mark time information corresponds to". Therefore, in Step S806 before then, even if the authentication using the registered marker ID is not performed, unintended marking can be prevented from being carried out.

To the contrary, in Step S806, if the authentication using the registered marker ID is performed, in Step S808, even when the correspondence relationship is simply specified only on the basis of the recording start time in the clip table, unintended marking can be prevented from being carried out. In this case, therefore, if the authentication using the registered marker ID is performed, it is not necessary to put the registered marker ID on the clip table.

Note that, when marking is carried out by the edition instrument 45 after coverage, it is effective for the video camera apparatus 41 to put the registered marker ID on the clip table.

When marking is carried out by the edition instrument 45 after coverage, the optical disk D and the marker apparatus 40, which have no correspondence relationship, may be incorrectly loaded in and connected to the edition instrument 45.

A specific example of such a case is exemplified.

For example, it is assumed that pairing is performed between a video camera apparatus 41 (hereinafter, referred to as "camera A") and a marker apparatus 40 (referred to as "marker A"), and then coverage (coverage A) is made by the camera A and the marker A in combination.

It is also assumed that pairing is performed between another video camera apparatus 41 (referred to as "camera B") and another marker apparatus 40 (referred to as "marker B"), and then another coverage (coverage B) is made by the camera B and the marker B in combination. In this case, it is assumed that the coverage B and the coverage A are made temporally in parallel.

After coverage, the user who gives the coverage A loads the optical disk D, which was loaded in the camera A, in the edition instrument 45, and causes the edition instrument 45 to carry out marking based on the time list generated by the marker A.

In this instance, it is assumed that the user incorrectly connects the marker B to the edition instrument 45.

As described above, since the coverage A and the coverage B are made temporally in parallel, in this case, if the correspondence relationship between the clip and the mark time is specified only on the basis of the information about the recording start time in the clip table, marking is carried out on a clip recorded by the coverage A on the basis of the time list from the marker B, which is used for the coverage B, and as a result, unintended marking is carried out.

In such a case, when marking is carried out by the edition instrument 45 after coverage, it can be seen that it is effective to put the registered marker ID on the clip table. That is, if the registered marker ID is put on the clip table, as described with reference to FIG. 17, the edition instrument 45 can specify the correspondence relationship between the clip and the mark time on the basis of the information contents of the clip table with a marker ID identical to the marker ID in the received time list. Therefore, in the above-described case, marking is not carried out on the clip recorded by the coverage A on the basis of the time list from the marker B, which is used for the coverage B, and as a result, unintended marking can be prevented from being carried out.

In the above description, a case where a marker ID is used in order to prevent unintended marking from being carried out has been described. Alternatively, on an assumption that the user adequately grasps the correspondence relationship between the clip and the marker apparatus, no marker ID is needed.

For example, when marking is carried out at the time of coverage, if no interference with another marker apparatus 2 is ensured, for example, if a single coverage team only uses a single marker apparatus 2, the authentication using the registered marker ID is not particularly needed. The attachment of the marker ID 11*b* to the marker apparatus 2 and the discrimination of Step S503 in the video camera apparatus 3 can be omitted.

Even when marking is carried out after coverage, if the user grasps the correspondence relationship between the marker apparatus 40 and the video camera apparatus 41, which are subjected to time synchronization, the attachment of marker ID 11*b* to the marker apparatus 40 and the processing using the marker ID in a marking apparatus (the video camera apparatus 41 or the edition instrument 45) after coverage (the discrimination of Step S806, the error processing of Step S811, and a processing to limit the clip table for the processing to specify the correspondence relationship to a clip table with a predetermined marker ID) are not needed.

From the above description, in the example where marking is carried out after coverage, a case where the marker apparatus 40 is USB-connected (wired connection) to the marking apparatus has been described, but wireless connection may be applied. In this case, the wireless communication unit 34 described with reference to FIG. 4 is preferably provided in each of the video camera apparatus 41 and the edition instrument 45.

In the above description, a case where the marker apparatus and the video camera apparatus are connected to each other in a wired manner at the time of pairing before coverage has been described, but pairing may be performed through wireless communication.

When pairing is performed through wireless communication, the video camera apparatus displays a communicable marker apparatus (for example, a marker ID) on the display unit 32. When there are a plurality of communicable marker apparatuses, the user is requested to select one of the marker apparatuses. In this case, if the user reliably grasps the correspondence relationship between the marker apparatus and its ID, pairing is prevented between unintended apparatuses, but actually an incorrect marker apparatus may be erroneously selected.

To the contrary, in the case of wired connection, the apparatuses subject to pairing are physically connected to each other, and thus the above-described erroneous selection is prevented.

In the first embodiment, the time list is transmitted from the marker apparatus 2 to the video camera apparatus 3 at a predetermined time interval, but the time list may be transmitted with a timing based on the user's operation.

In the first embodiment, the acquired mark time information is listed and transferred as the time list, but the mark time information may be sequentially transmitted to the video camera apparatus 3 each time the mark time is assigned by the mark button operation.

In the above description, a case where the time code representing the time length elapsed from the recording start time is put on the clip has been described. Alternatively, when time information, instead of the time code, is put, mark time information→time code conversion is not needed.

In the above description, a case where direct wireless data communication with the external apparatus in the ad-hoc mode of wireless LAN is performed has been described. Alternatively, network communication with a network access point may be performed through the near field wireless communication network.

The wireless communication system should not be limited to wireless LAN, but other systems, such as Bluetooth (Registered Trademark) and the like, may be used.

In the above description, a case where an object to be marked is motion image data has been described, but the invention may be favorably applied to a case where a mark is put on other kinds of time-series data, such as sound data and the like.

In the above description, a case where the signal processing apparatus uses an optical disk recording medium as a recording medium, onto which time-series data is recorded. Alternatively, time-series data may be recorded onto another recording medium having a semiconductor memory, such as a so-called memory card or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus comprising:
an operation unit for receiving user input;
a time clocking unit performing time clocking;
a communication unit performing communication with an external apparatus; and
a control unit, wherein the control unit executes:
in response to a transmission request from the external apparatus for current time information, a time synchronization processing for clocked time synchronization with the external apparatus having a second time clocking unit performing time clocking in which the current time information from the time clocking unit is transmitted from the terminal apparatus,
a time information acquisition processing to acquire first and second time information of a video segment based on the time clocking by the time clocking unit while the external apparatus is recording video information of the video segment with time information determined from clocked time information of the second time clocking unit of the external apparatus synchronized with the time clocking of the time clocking unit based on the transmitted current time information and before the external apparatus is recording the video information, wherein each first and second time information corresponds to a timing at which user input is received at the operation unit, the first time information being acquired before the second time information,
a time list information generation processing to list, in a time list, the first and second time information, wherein the first time information and the second time information are identified as mark time information of the video segment, and
a transmission control processing to control the mark time information to be transmitted to the external apparatus through the communication unit.

2. The terminal apparatus according to claim 1, further comprising:
   a storage unit storing terminal identification information for identifying the terminal apparatus,
   wherein the control unit further executes an identification information registration processing to register the terminal identification information in the terminal apparatus by causing the terminal identification information to be transmitted to the external apparatus through the communication unit, and
   in the transmission control processing, the terminal identification information is controlled to be transmitted together with the mark time information.

3. The terminal apparatus according to claim 2, wherein, in the time list information generation processing, the terminal identification information is put on the corresponding list, as time list information, and in the transmission control processing, the time list information generated by the time list information generation processing is controlled to be transmitted to the external apparatus.

4. The terminal apparatus according to claim 3, wherein the communication unit performs communication with the external apparatus in a wireless manner.

5. The terminal apparatus according to claim 4, wherein, in the transmission control processing, the time list information is controlled to be transmitted to the external apparatus at a predetermined time interval.

6. The terminal apparatus according to claim 3, wherein, in the transmission control processing, the time list information is controlled to be transmitted to the external apparatus in accordance with a transmission request from the external apparatus.

7. The terminal apparatus according to claim 6, wherein the communication unit performs communication with the external apparatus in a wireless manner.

8. The terminal apparatus according to claim 6, wherein the communication unit performs communication with the external apparatus in a wired manner.

\* \* \* \* \*